US009234728B2

(12) United States Patent
Akcasu et al.

(10) Patent No.: US 9,234,728 B2
(45) Date of Patent: Jan. 12, 2016

(54) ROCKET OR ARTILLERY LAUNCHED SMART RECONNAISSANCE POD

(71) Applicant: Lonestar Inventions, L.P., Morgan Hill, CA (US)

(72) Inventors: Osman Ersed Akcasu, Morgan Hill, CA (US); Ibrahim Onur Uslu, Istanbul (TR); Yusuf Leblebici, Lutry (CH)

(73) Assignee: Lonestar Inventions, L.P., Morgan Hill, CA (US)

( * ) Notice: Subject to any disclaimer, the term of this patent is extended or adjusted under 35 U.S.C. 154(b) by 0 days.

(21) Appl. No.: 14/075,990

(22) Filed: Nov. 8, 2013

(65) Prior Publication Data

US 2015/0128823 A1    May 14, 2015

(51) Int. Cl.

| | |
|---|---|
| *F42B 12/36* | (2006.01) |
| *F42B 10/56* | (2006.01) |
| *B64D 17/00* | (2006.01) |
| F42B 30/00 | (2006.01) |
| F42B 5/02 | (2006.01) |

(Continued)

(52) U.S. Cl.
CPC .............. *F42B 12/365* (2013.01); *B64D 17/00* (2013.01); *F42B 10/56* (2013.01); *F42B 5/025* (2013.01); *F42B 10/50* (2013.01); *F42B 12/58* (2013.01); *F42B 30/006* (2013.01)

(58) Field of Classification Search
CPC .......... F41H 11/20; F42B 5/025; F42B 10/48; F42B 10/50; F42B 10/56; F42B 30/006; F42B 12/365; B64D 17/00
USPC ............. 102/502, 430, 489; 89/1.11; 244/3.1, 244/13, 3.11; 348/144, 211.99; 340/946
See application file for complete search history.

(56) References Cited

U.S. PATENT DOCUMENTS 3,721,410 A * 3/1973 Anspacher ................ F41G 3/02
                                                       178/76
3,962,537 A * 6/1976 Kearns .................. F42B 12/365
                                                       244/3.14

(Continued)

FOREIGN PATENT DOCUMENTS

DE          41 04800 A1    8/1992

OTHER PUBLICATIONS

Extended European Search Report for EP Patent Application No. 14192253.4 mailed on Mar. 19, 2015, 8 pages.

*Primary Examiner* — Samir Abdosh
*Assistant Examiner* — John D Cooper
(74) *Attorney, Agent, or Firm* — Kilpatrick Townsend & Stockton LLP; Kenneth R. Allen

(57) ABSTRACT

A modular reconnaissance capsule or reconnaissance pod is provided that is suitable for deployment by means of an artillery launching platform, such as a conventional 40 mm grenade launcher or 155 mm cannon wherein a parachute is deployed at a pre-calculated observation altitude, the parachute being designed to yield a sufficiently slow rate of descent to permit live video capture and transmission of images as forward observation information. Alternatively, pods according to the invention may also be air dropped from an aircraft, either piloted or pilotless, thus allowing the aircraft to operate at a safe distance and yet provide close reconnaissance even under a cloud cover. Accurate information about targeting dynamics is made available to the user through commercially available products. The invention complements other reconnaissance methods and provides easy-to-use real-time visual information for a desired area of interest.

7 Claims, 31 Drawing Sheets

(51) Int. Cl.
*F42B 10/50* (2006.01)
*F42B 12/58* (2006.01)

(56) References Cited

U.S. PATENT DOCUMENTS

| | | | | |
|---|---|---|---|---|
| 5,467,681 A * | 11/1995 | Liberman | F42B 10/56 | 244/3.1 |
| 6,037,899 A * | 3/2000 | Weber | F41G 3/142 | 244/3.2 |
| 6,119,976 A * | 9/2000 | Rogers | B64C 39/024 | 244/13 |
| 6,380,889 B1 * | 4/2002 | Herrmann | F41G 3/02 | 340/870.1 |
| 6,764,041 B2 * | 7/2004 | Oron | F41G 3/02 | 244/3.1 |
| 6,924,838 B1 * | 8/2005 | Nieves | H04N 5/2251 | 348/143 |
| 6,978,717 B1 * | 12/2005 | Hambric | F42B 12/365 | 102/473 |
| 7,073,749 B2 * | 7/2006 | Krill | B64B 1/02 | 244/125 |
| 7,341,224 B1 * | 3/2008 | Osann, Jr. | B64C 39/028 | 244/30 |
| 7,437,985 B2 * | 10/2008 | Gal | F42B 12/362 | 102/502 |
| 7,467,762 B1 * | 12/2008 | Parsons | F42B 10/56 | 244/138 R |
| 7,631,601 B2 * | 12/2009 | Feldman | F42B 12/365 | 102/502 |
| 8,297,161 B2 * | 10/2012 | Munzner | F42B 10/56 | 102/293 |
| 8,686,325 B2 * | 4/2014 | Rastegar | F41G 7/30 | 102/473 |
| 2002/0166442 A1 * | 11/2002 | Sirmalis | F42B 12/365 | 89/1.11 |
| 2003/0089219 A1 * | 5/2003 | Gorman | F41H 11/02 | 89/1.11 |
| 2003/0089820 A1 * | 5/2003 | Martorana | B64C 39/024 | 244/3.1 |
| 2004/0066451 A1 * | 4/2004 | Schroth | F42B 12/365 | 348/144 |
| 2004/0075585 A1 * | 4/2004 | Kaiser | F41F 3/045 | 340/946 |
| 2004/0196367 A1 * | 10/2004 | Raymond | F42B 12/365 | 348/144 |
| 2006/0005733 A1 | 1/2006 | Rastegar et al. | | |
| 2006/0010998 A1 * | 1/2006 | Lloyd | F42B 12/365 | 73/866.5 |
| 2007/0266884 A1 * | 11/2007 | Finneral | F41G 7/226 | 102/489 |
| 2008/0196578 A1 * | 8/2008 | Eden | F42B 12/365 | 89/1.11 |
| 2008/0276821 A1 * | 11/2008 | Stancil | F41G 3/02 | 102/502 |
| 2010/0093270 A1 | 4/2010 | Bass | | |
| 2011/0100202 A1 * | 5/2011 | Bass | F42B 12/365 | 89/1.11 |

\* cited by examiner

ROCKET OR ARTILLERY LAUNCHED SMART RECONNAISSANCE POD

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The invention relates to reconnaissance, namely the gathering of up-to-date visual information related to a desired area of interest. More particularly, the invention is a launchable pod and method of using a launchable pod containing cameras, infrared sensors, GPS, magnetic compass and a radio transmitter which is deployed by ballistic means, such as rocket, grenade launcher, an artillery piece or an aircraft.

There is an important void in the reconnaissance puzzle at a tactical level. That void is the need to observe a target without putting individuals and/or expensive or renewable observation vehicles at risk. "Current and instantaneous" visual or infrared information regarding a specific area in an inaccessible location such as a combat zone or a battlefield is a very important piece of information in any level of the chain of command ranging from platoon level all the way up to the short-, medium- and long-range artillery fire control and command structure. In this instance "current and instantaneous" means up-to-date visual information related to a desired area of interest in the order of several minutes after the time when the visual information is needed for a duration of minutes up to 30 minutes, depending on the ejection altitude. An "area of interest" ranges over an area which covers a radius from 50 m to 2,000 m depending on the altitude. "Range of interest" is a distance of 50 m to 40 km from a launch site, depending on the delivery platform used.

Reconnaissance related to a specific area of interest at a given time is a very important piece in any level of combat situation, from a platoon to long range artillery fire command and control. This wide spectrum of information covers a chain of command structure from the platoon commander level all the way up to the battalion and division commander level, which is needed to make the right combat decisions at any instance of time for the combat sector in a battlefield scenario. In a modern military, strategic level of reconnaissance is provided by reconnaissance satellites and reconnaissance aircraft. This very valuable reconnaissance information contains massive amount of data which is related to a very large area, and it must be analyzed, which can be very time consuming. As a result, the data gathering, processing and interpretation does not achieve current, or "up-to-date" status—on the order of minutes—after a request for reconnaissance is issued. At a tactical level, reconnaissance information is gathered by many means such as a manned winged aircraft, a helicopter, a missile, a bomb observation balloons, spotting aircraft, a UAV and forward observer personnel (FO) or reconnaissance patrols. Needless to say forward observers and recon patrols are subject to very high risk and require planning ahead of time, which uses great amounts of valuable highly trained and skilled combat resources.

UAV's are becoming a very popular means of gathering visual data related to a specific area of interest, but they require dedicated skilled resources for piloting and data interpretation, and they cannot be deployed and activated instantaneously, and they cannot be at a desired location at a desired time reliably due to their launch constraints, limited range and nature of their flight characteristics, including speed and maneuverability. Small, hand launched electrically powered UAV's have been developed, but their range and deployment duration are generally limited, measured in several miles and minutes, and since they have very limited speed, they may not timely arrive at a desired location. What is needed is a better and more versatile observation vehicle.

Hereafter are listed references believed to represent the state of the art in the relevant field:
"Artillery Projectile Containing Submunitions", Wolgang von Entress-Fursteneck, U.S. Pat. No. 4,807,533
"Ejection Device", Klaus D. Karius, Peter Tripptrap, Karl-Heinz Vogt, U.S. Pat. No. 5,210,372
"Pyramid Projectile Payload Ejection Device", Louis J. Adimari, George D. Dusoe, U.S. Pat. No. 3,981,244.

SUMMARY

According to the invention, a modular reconnaissance capsule or reconnaissance pod is provided that is suitable for deployment by means of an artillery launching platform, such as a conventional 40 mm grenade launcher or an artillery piece such as a 155 mm cannon wherein a parachute is deployed at the a desired, pre-calculated observation altitude and location, the parachute being designed to yield a sufficiently slow rate of descent to permit live video capture and transmission of images as forward observation information. The pod simulates a projectile so as to match ballistic characteristics. Alternatively, pods according to the invention may also be air dropped from an aerial vehicle, either piloted or pilotless, such as a manned winged aircraft, a helicopter, a missile, a bomb, an observation balloon, or a UAV (e.g, drone), thus allowing the aerial vehicle to operate at a safe distance and yet provide close reconnaissance even under a cloud cover. Accurate information about targeting dynamics is made available to the user through commercially available devices.

The invention will be better understood by reference to the following detailed description in connection with the accompanying drawings.

DETAILED DESCRIPTION

Figure 1A:
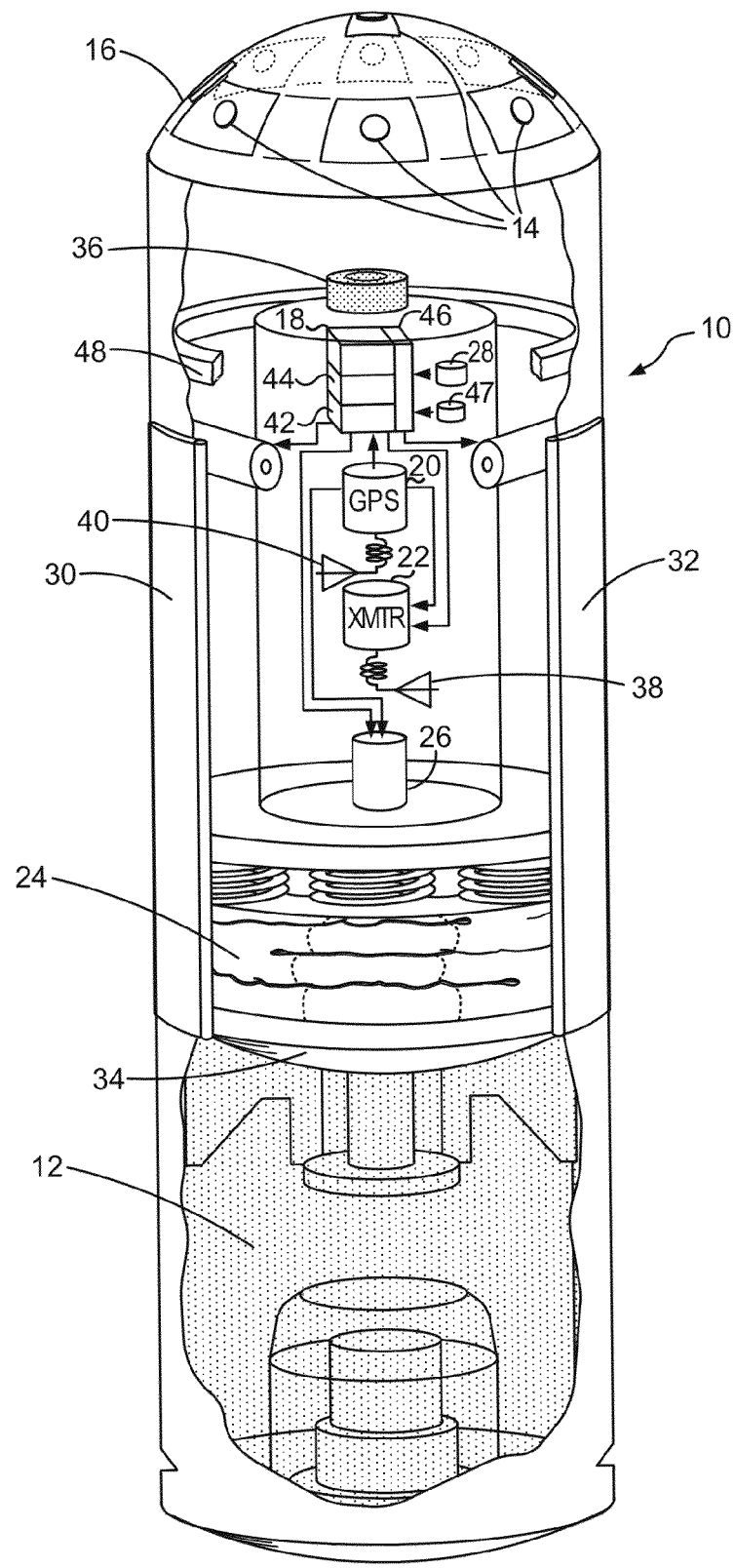
FIG. 1A is a perspective view in partial cutaway of a single reconnaissance pod according to one embodiment of the invention.
Figure 1B:
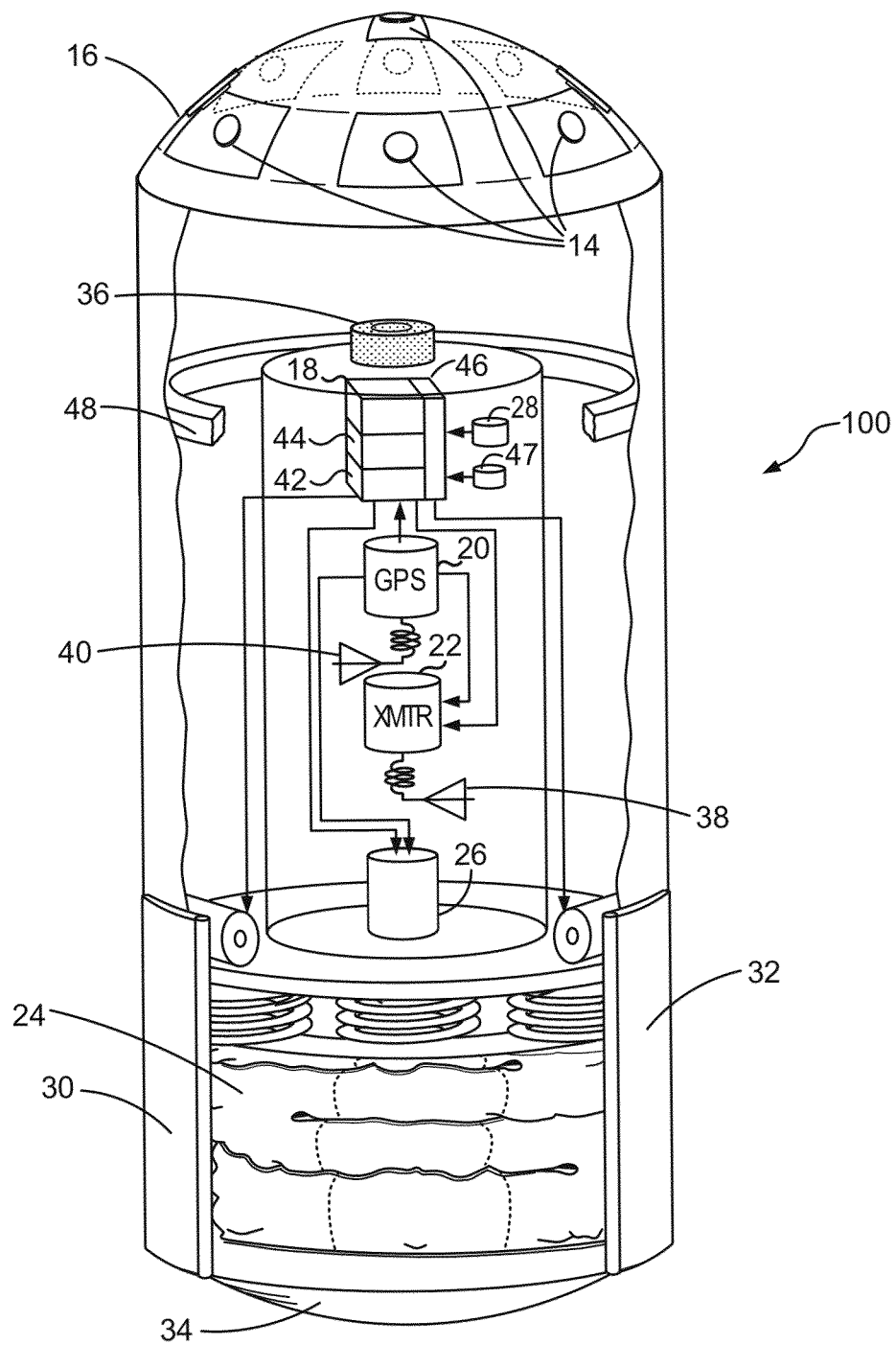
FIG. 1B is a perspective view in partial cutaway of a single reconnaissance pod according to a second embodiment of the invention.
Figure 1C:
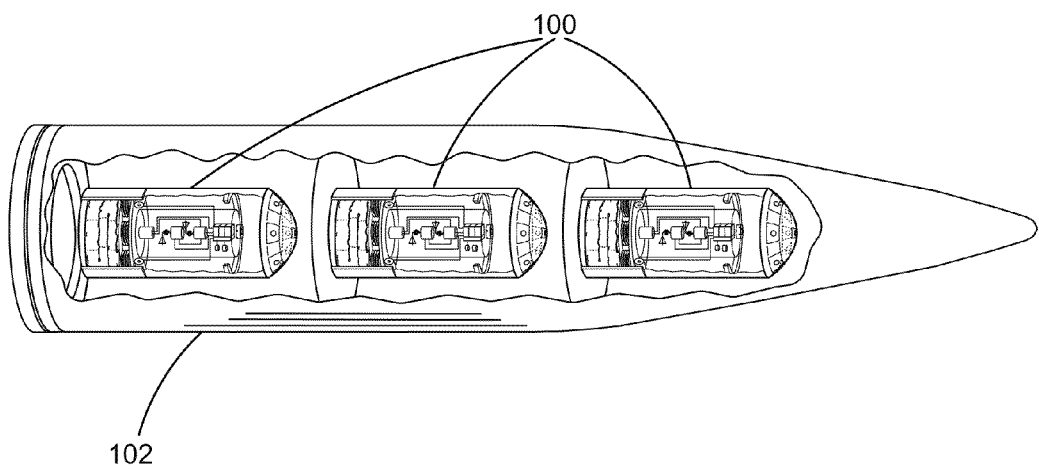
FIG. 1C is a side view in partial cutaway of an artillery shell containing an array of reconnaissance pods according to the second embodiment of the invention.

The invention in a specific embodiment includes a capsule or pod that matches the form factor, mass and mass distribution of a projectile (FIG. 1A, 1B) or has a form factor (FIG. 1B) that can be housed in a shell (FIG. 1C). The first embodiment (FIG. 1A) matches the form factor and mass of ordinance so that the ballistic characteristics closely match that of the projectile that it simulates, so that it can be launched from a variety of platforms. In the second embodiment, the form factor and weight is such that a plurality of pods can be installed as payload in place of explosive material so as to match the payload and weight distribution of an artillery shell. One example of a launcher for the first embodiment is an M203-type grenade launcher. In any embodiment, the pod is equipped with sensors and communication mechanisms so that it can communicate with a remote monitoring station that collects intelligence such as images and location.

For example, there are various types of 40 mm grenades that can be launched from an M203-type launcher. In a specific embodiment illustrated in FIG. 1A, a pod 10 is in the form factor of a 40 mm illumination grenade known as "Star Parachute Round" modified in that its illumination charge is replaced by electronic and optical hardware needed for the observation and communication tasks. As illustrated, the pod 10 is in the form of the shell of such an illumination grenade. However, the pod may be so modified to be enclosed within the skin of an appropriate sized shell, or as further housed as explained hereinafter. The hardware in the pod 10 includes an observation system, such as a plurality of cameras and/or infrared sensors 14 mounted in the nose 16, a control system 18 that is coupled to digital outlets of the cameras/sensors 14 to store and forward digital image information, a locator system, such as a GPS unit 20 that is operative to accurately collect the geographic location and altitude position of the pod 10, a communication system such as a transmitter 22 that collects image data and position data and transmits the data as intelligence to a remote receiver, a parachute 24, typically in the base of the pod 10, for suspending the pod 10 over a target area, including a parachute launcher 26, optionally triggered by the GPS unit 20 or an accelerometer 28, under control of the control module 18, a standard explosive propellant unit 12 in the base of the pod 10 for launching the pod 10, air brakes 30, 32, including the deployable parachute chamber cover 34, for slowing the pod 10 in preparation for deploying the parachute 24, and a charge unit 36 for destroying the pod for security purposes. Antennas 38 and 40 for the transmitter 22 and GPS unit 24 may be of substantial length and are typically deployed after ejection of the parachute 24. The geometry and dimensions of the pod 10 in this specific embodiment comprise a cylinder 40 mm in diameter and 13.39 cm in length with nose cap 16. Its conventional weight is 0.22 kg. Along with its dimensions, the pod 10 is of a mass and mass distribution closely matching that of the 40 mm "Star Parachute Round." To this end, a weighted ring 48 is disposed within the inner circumference of the pod 10 and spaced at a position to establish a center of mass corresponding to that of a conventional "Star Parachute Round." This property provides ballistic characteristics to the pod 10 closely matching that of a "Star Parachute Round." This choice is important in the field so that recalibration is unnecessary and no additional training is needed beyond conventional grenade launcher training, so far as aiming is concerned.

The parachute 24 of the pod 10 has mechanics such that it can be deployed at a controlled time, altitude or flight position after it is launched. Since the weight of the pod 10 and its parachute 24 are identical to that of the 40 mm "Star Parachute Round" the pod 10 will descend with a prescribed limit velocity of 2.1336 m/s (7 feet/sec). Video information from the cameras 14 will be gathered while the pod 10 is descending with its deployed parachute. This gives in the order of 45 to 60 seconds of video capture time of the target area when launched from the M203 grenade launcher. In an alternative embodiment, the video capture time of the target area can be as much as 20-40 minutes when delivered from a mortar or a long range cannon such as a 155 mm howitzer.

The view area is a function of the altitude where the pod 10 is released and of the camera view angle. Since altitude decreases with time during the decent of the pod, the view area also decreases as a function of time as the pod descends. To increase the view angle, up to nine cameras may be placed in the nose 16 with overlapping coverage areas giving an effective view angle in the order of 120°. This allows the maximum range of the gun to be viewed for a sufficient time with proper calculation of the trajectory of the projectile and release altitude.

The pod 10 may additionally contain electronic magnetic compass 47, memory 42, digital circuits for image compression 44 along with a battery 46 to power the electronic circuits. The pod 10 using its radio frequency transmitter 22 relays its real time GPS coordinates, altitude, speed and its orientation (angle and compass direction) along with the live video. Integrated circuit technology is capable of realizing such an electronic system in the available volume and weight available in the illumination charge section of a standard capsule with ease. (A very similar capability is already in smart phones!) In a specific embodiment, a prototype for this system has been realized as a proof of concept using a smart phone development kit (available for example from Qualcomm, Inc., of San Diego, Calif.) that has 900 mW of RF transmit power at 2.4 GHz and that has been launched in prototype form using a commercially available hobby rocket.

Combining the video information with the GPS coordinates of the pod as a function of time gives the capability to superimposing the video information on a digital map at the receiving end and processing it for coordinate information related to any point on the real time video. This additional video processing on the received video information at the launch position provides great value for a fire control team. The distance and bearing information of any point on the received video image can be obtained very quickly with the GPS accuracy with commercial software available in many smart phone and tablet application programs. One such provider is OEA International, Inc. of Morgan Hill, Calif.

In various embodiments, the pod comprises its functional elements housed in a standard projectile casing, namely a casing that is already in use for the available barrel caliber. A type "high g" housing is preferred. Referring for example to FIG. 1B, a perspective view is shown in partial cutaway of a single reconnaissance pod 100 according to a second embodiment of the invention. This pod 100 is identical to that of FIG. 1A with the exclusion of the standard explosive propellant unit 12 in the base of the pod. This embodiment is useful in situations where self-propelled projectiles are not used or necessary, as hereinafter explained. The overall goal is to have the same ballistic characteristics of a standard projectile delivered from an available gun for which the fire control team is already well trained for. This can only achieved by having the comparable mass, mass distribution and aerodynamic properties as the standard projectiles fired from that gun system after everything assembly of the projectile.

Since the pod 10 or 100 is intended to be delivered in projectiles from many gun systems, it must be able to withstand very large g forces generated during its acceleration in the gun barrel. These g forces can be in the order of 5,000-40,000 g, depending on the gun system. In addition, the mechanical, optical and electronics should also be able to withstand very high rotational acceleration effects if fired from a rifled barrel.

An analysis of the characteristics of launch and flight is useful to understand the invention. To accurately calculate rotational speeds due to rifling, the turn/length of rifling, barrel diameter, muzzle velocity and some other parameters are needed. Those parameters vary significantly between gun systems. As an example, for the M16 rifle with 1:7 turn/length (inches) rifling and 929.64 meter/sec (3,050 feet/sec) muzzle velocity, one can simply calculate the rotational speed of the bullet by finding the time it takes to travel 7 inches (0.1778 meter)/929.64 (meter/sec) giving $1.911256.10^{-4}$ (sec) for one turn. This corresponds to $60/1.911256.10^{-4}=313,714$ rpm or 32,852.05 radian/sec. For the diameter of 5.56 mm this will give 305,844.605 g of rotational acceleration at the circumference of a bullet. For larger diameter barrels or spin stabilized rocket delivery systems the rotational turn rate is much less than this, but it still will have very large values depending on the muzzle velocity and turn rate. Therefore it becomes a parameter which can't be ignored in the mechanical design of the pod and its "high g" housing.

The mechanical design challenges related to high g's in the barrel have already been resolved for some time. Proximity fuses have contained electronics and have been in use since the 1940's. As a recent example, the Excalibur 155 mm round has far more complex electronics compared to the pod explained in this invention and has been operational for some time.

Maximum range of field artillery is greater than 5 km, which can exceed the radio range of the pod 10/100 according to the invention. The communication range between an RF transmitter and a receiver depends on many factors, including line of sight between the transmitter in the pod 10/100 and a receiver on the ground at the frequency of interest. A solution for this problem for long range reconnaissance exceeding the RF transmitting range of a single pod is described hereinafter. The maximum range of artillery greatly varies based on the caliber, powder charge used, barrel length and type of the gun system. The firing solutions assume a standard shell of known weight, shape and mass distribution. As an example, a standard World War II era 155 mm L23 howitzer, which is still in use, has a barrel length of 3.564 m and has a maximum firing range of 14,600 m for a 43 kg standard high explosive (HE) round. On the other hand, a 406 mm (16 inch) naval gun can have a maximum range of 38 km with 300 kg powder charge firing a 862 kg projectile. Using a limited propellant and projectile mass reduces the maximum range of land-based gun systems. Employing base bleed or Rocket Assisted Projectile (RAP) techniques, the maximum range of land-based artillery has increased dramatically, exceeding 30 km. The GPS controlled Excalibur 155 mm round can reach 40 km. A Rheinmetall 155 mm L52 which is used in PzH2000 self-propelled gun with a barrel length of 8 m, using base bleed or Rocket Assisted Projectile (RAP) demonstrated a range of 56 km, and maximum range may well be over 60 km. The PzH2000 also has a 5-round Multiple Rounds Simultaneous Impact (MRSI) capability achieved by changing the elevation and amount of propellant.

As can be seen, many of these maximum ranges can be well beyond the transmit range of pod electronics alone. Since the launched pod is several hundreds of meters above the ground while transmitting with far better transmitter antenna compared to a cell phone, one can expect that it should have at least twice the transmit range of a cell phone in open space, which can achieve a range of 10 km with the same power if the pod is in visual contact with the receiver. This extended range still will not cover the maximum ranges under consideration of 40 km with the 900 mW of transmit power.

Figure 23:
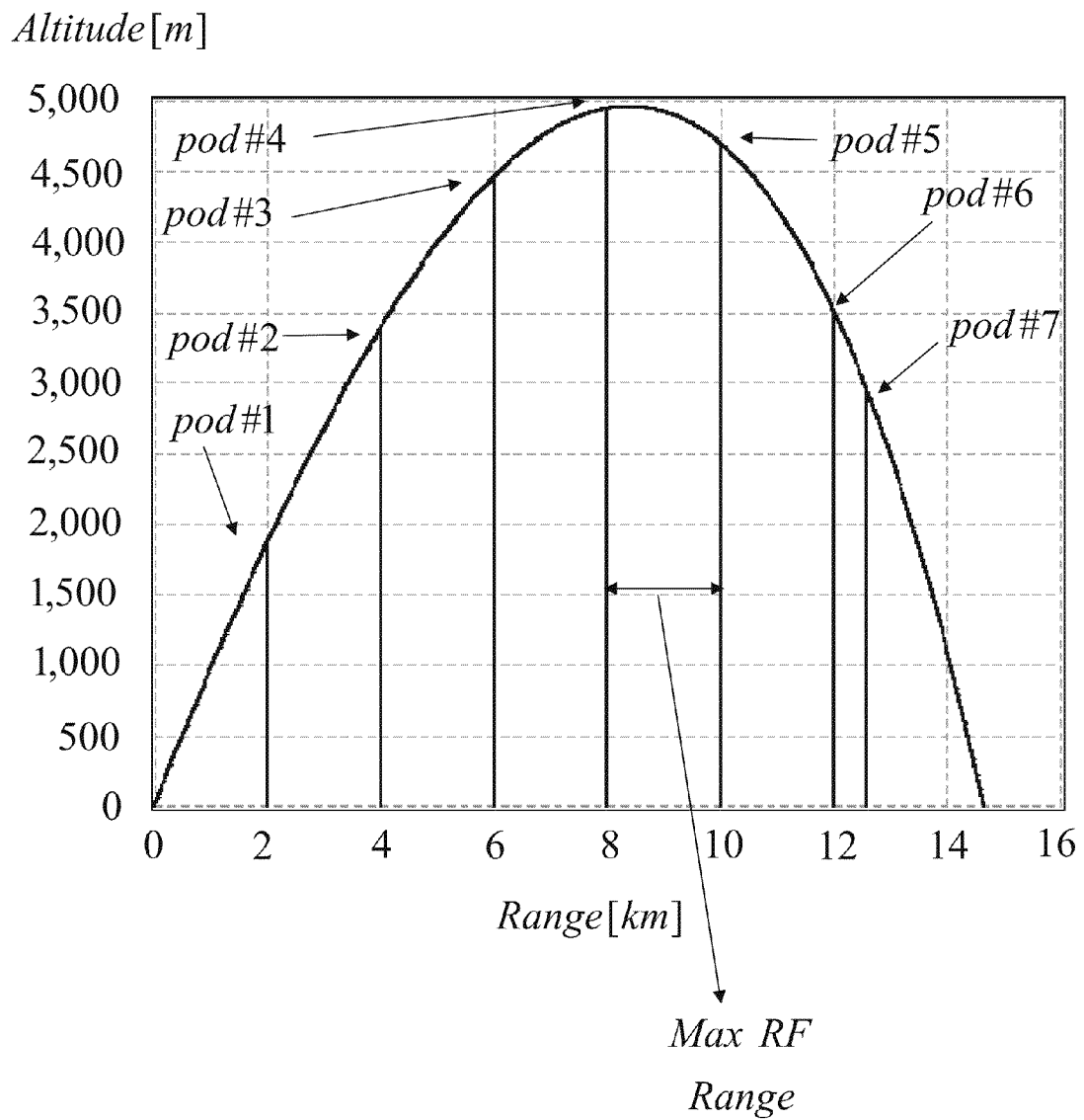
FIG. 23 is a graph illustrating a radio frequency air bridge formed of multiple pods released serially along a trajectory.

The risk of losing radio communication between the pod 10 and the launch site for long range missions is resolved by using a radio communication air bridge, as illustrated in FIG. 23. According to the invention, larger caliber rounds may be launched whose casings contain multiple pods which are released at different times and positions along the shell trajectory. The pods may in fact be the modules designed for use in grenade launchers. During descent, the distributed pods serve as radio repeaters or as relay nodes to relay radio frequency transmissions from the furthest pod to the position where a receiver is located. This can be done by simulcasting on different frequencies from reception or by single frequency burst transmissions using store and forward techniques. If the maximum reliable radio data transfer range of each pod is 5 km, to establish a reliable radio communication between the furthest pod deployed at the gun's maximum range of 14,600 m will require three or more pods in between. FIG. 23 illustrates deployment of seven pods over this range. The pods must be released serially at proper times as the projectile travels along its trajectory to establish separation distances at less than the reliable communication range between them. For a 40 km of maximum range the same analysis dictates that eight of the modular pods must be carried in the standard round and each must be released at accurately calculated time intervals for a successful operation of this invention. Small and light modular pods of 0.22 kg each gives a total payload of 1.76 kg for eight modular pods installed in a 155 mm round, which is far less than the standard explosive charge of approximately 7 kg. If eight pods are lined up back to back, each having a length of 150 mm including their housing and ejection mechanism, the total length that they will occupy will be 1,500 mm, which exceeds the available length of 605.3 mm of a 155 mm round. Simple calculation gives maximum of three pods with that can be housed in the standard 155 mm round. This is shown in FIG. 1C, where three pods of type 100 are disposed along the central axis of the central chamber of the round 102, each preferably facing the front end of the chamber for more stable parachute deployment. (In some configurations the middle pod could be rear facing, but stability may be sacrificed.) The pod-equipped shell has the same center of mass and inertial characteristics as a standard shell. Using this deployable communication bridge, it has been determined that the specification on the RF communication range of the pods is better than 14 km of a 40 km of ballistic range.

The lack of adequate capacity in a standard 155 mm round is solved by using multiple rounds containing multiple or single pods fired at different times or fired simultaneously from different gun positions such that the distances between the pods are less than their RF communication ranges. This approach is also useful in another way to extend the video communication between the pods after they have landed and are used for ground-based video/audio or seismic reconnaissance. This approach simplifies the carrier projectile design, but it requires multiple rounds to be fired, so it is a trade-off between the mechanical design complexity of the carrier projectile and convenience in using the system.

The pod 100 in a shell 102 may carry a higher powered and therefore larger and heavier transmitter 22 having a reliable direct RF communication range of 40 km. While this can be a challenging electronic design for the space and weight constraints on pods 10 imposed by the 40 mm grenade launched pod design, the problem is solvable if the pod 100 is specifically designed such that it can fit in a 155 mm HE howitzer round. Approximate RF transmitter power needed for a range of 40 km can be approximated as 8-10 Watts. Since the power to the electronics is supplied with a battery and the pod 100 needs to transmit for at least 30-40 minutes, the battery life also becomes an issue to consider.

Figure 2A:
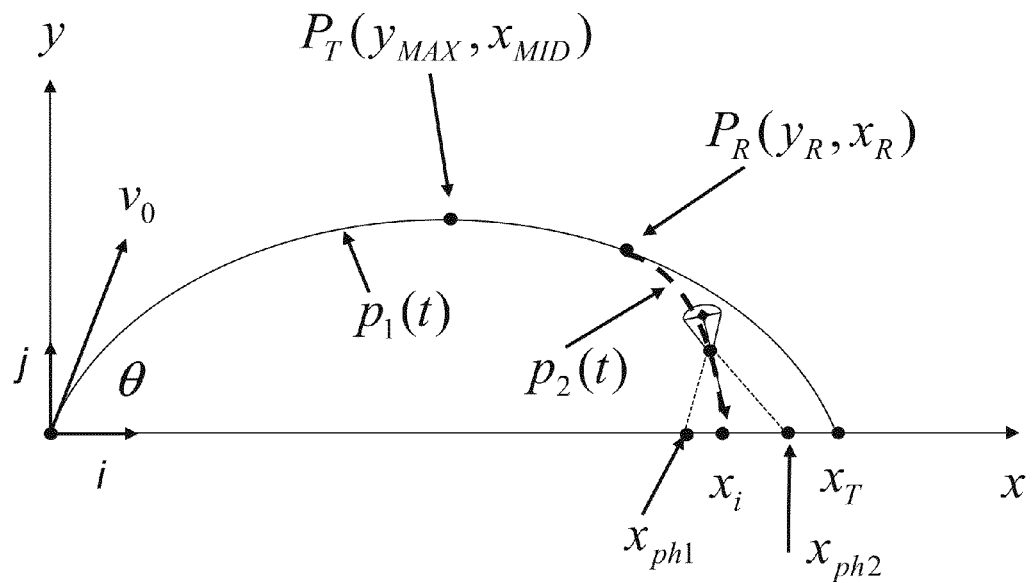
FIG. 2A is a diagram for illustrating trajectory of a ground launched projectile according to the invention.
Figure 2B:
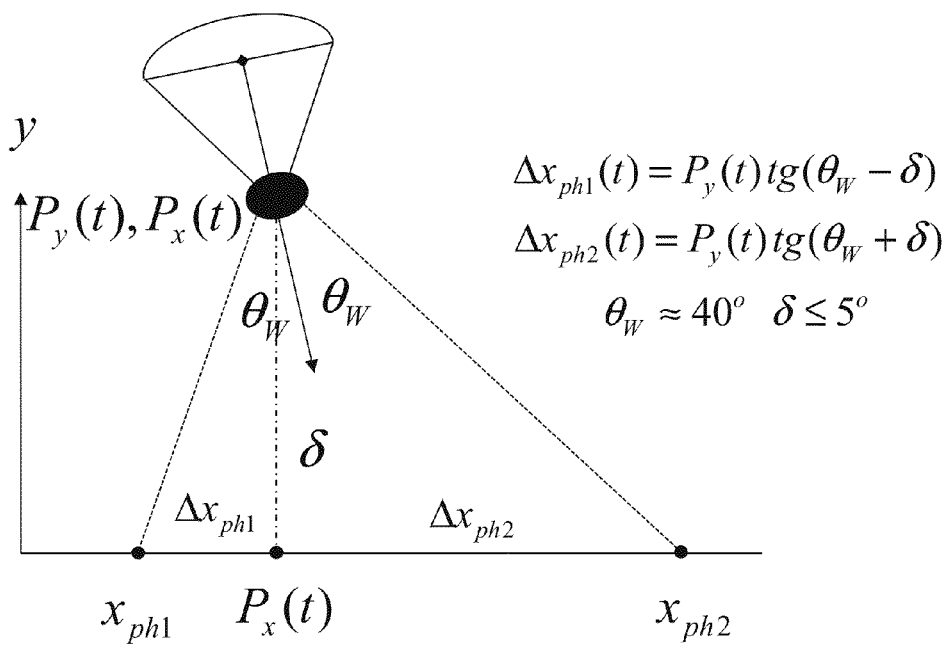
FIG. 2B is a detail of a trajectory according to the invention.

The basic concept of operation according to the invention is shown in FIG. 2A and FIG. 2B. The projectile containing a pod 10 according to the invention is launched with a muzzle velocity of $v_0$, at an angle $\theta$ on path $p_1(t)$. The parachuting pod follows a path $p_2(t)$ and lands in a range from $x_{ph1}$ to $x_{ph2}$. The viewing angle from pod during descent is $\theta_w$ relative to the center line of the pod, which is at an angle $\delta$ due to the forward drift of the parachute. The positions and angles are determined by formulae as set forth in FIG. 2B.

At the launch site, there is a receiver, typically associated with a fire control computer (not shown) having embedded fire control software for calculating trajectory parameters and deployment protocols. A variety of such software is available; however, accuracy can be enhanced using software available from OEA International, Inc., of Morgan Hill, Calif., as noted below. The receiver end hardware is typically very small so it can be handled by a single operator with ease such as a smart phone or computer tablet. The operator will basically watch the live video of an area as the pod descends on the target point, and software may be provided that can freeze, zoom and pan the video image as well as take coordinate measurements on the still images. All these functions and more capabilities known as "OEA Astronomical and Navigational Utilities" are available as a commercial software package from OEA International of Morgan Hill, Calif., and have already been implemented for general purposes (not including specific enhanced fire control applications) and used in many smart phone and computer tablet application programs. As of 2013, there are already 24 smart phone application programs developed and marketed by OEA International, Inc. that are implemented on Apple and Android operating system and which are in use in 108 countries.

Using the surveillance capabilities according to the invention, one can answer the basic tactical question of "who is behind that corner or that wall or that roof top with what kind of force" and it can be easily answered in a matter of minutes after the pod is launched for planning the platoon commander actions. The same receiving end hardware can do functions for fire control purposes of long range artillery as well. The receiver hardware and software are identical for any level of command structure. This yields savings in training time of the users, since they only need to select the hardware platform which is determined by their display size.

The feasibility analysis of the method, the physical design of the pod and its electronics required a detailed computer analysis of the entire system, which is based on solving differential equations that characterize the equations of motion of a projectile in any trajectory that it travels predictably. It is mainly a ballistic problem that can be analyzed as simply as applied high school physics, but the problem could be made a very challenging mathematical and physical problem depending on the desired degree of accuracy in the analysis Two programs from OEA International, Inc., have been employed in the analysis and verification of feasibility. The first analysis program, called "Gun Barrel", has been used to analyze the projectile motion in a gun barrel, and the second analysis program, called "Ballistic" has been used to determine projectile and pod trajectory essential and is useful to determine intended release times of the pods when fired from long range artillery or dropped from a plane. The "Gun Barrel" program is used to obtain an accurate calculation of the linear and rotational acceleration of the projectile while traveling in the gun barrel. Both of these programs can be incorporated into fire control software packages to improve accuracy of projectile deployment, whether or not for the purposes herein disclosed.

The results given by these programs in analysis mode demonstrated the method of operation with real life examples for 40 mm grenade launcher and the L23 155 mm howitzer along with the mechanical and electronic specifications imposed on the design. Simulation results may be compared with the simplest assumptions to show the need for accurate analysis programs such as "Gun Barrel" and "Ballistic".

The following paragraphs recount the analysis and establish the efficacy of this invention. Starting from a simple formulation of the issues related to this invention, consider trajectory calculations with constant gravitational acceleration This assumption is the simplest way of formulation. In this case we refer to FIG. 2A and FIG. 2B, where there is a projectile leaving the muzzle of a gun with a given velocity $v_0$ with only gravity acting on the projectile as an external force. In this case velocity components of the projectile in x and y direction can be written as, $$v_x(t) = v_0 \cos(\theta) \tag{1}$$

and $$v_y(t) = v_0 \sin(\theta) - gt \tag{2}$$

where g is the gravitational acceleration, which can be taken as 9.81 m/s² at the equator. The velocity magnitude of the projectile will be, $$v(t) = \sqrt{v_x^2(t) + v_y^2(t)} \tag{3}$$

Integrating (1) and (2) over time will give the parametric representation of the trajectory as, $$x(t) = \int_0^t v_0 \cos(\theta) dt \tag{4}$$

and, $$y(t) = \int_0^t [v_0 \sin(\theta) - gt] dt \tag{5}$$

The x(t) and y(t) corresponds to the distance of the projectile from the gun position and its altitude respectively. Giving the parametric equation of the trajectory as, $$x(t) = v_0 t \cos(\theta) \tag{6}$$

$$y(t) = v_0 t \sin(\theta) - \frac{1}{2} g t^2 \tag{7}$$

Since the projectile can gain altitude in y direction until (2) becomes zero and we can calculate the time $t_p$ to reach the peak point of the trajectory by solving, $$v_0 \sin(\theta) - g t_p = 0 \tag{8}$$

giving, $$t_p = \frac{v_0 t \sin(\theta)}{g} \tag{9}$$

Substituting $t_p$ in (7) will give, $$y_p = v_0 t_p \sin(\theta) - \frac{1}{2} g t_p^2 \tag{10}$$

and solving (10) gives, $$y_p = v_0 \left[ \frac{v_0 \sin(\theta)}{g} \right] \sin(\theta) - \frac{1}{2} g \left[ \frac{v_0 \sin(\theta)}{g} \right]^2 \tag{11}$$

With some arithmetic (11) becomes, $$y_p = \frac{v_0^2 \sin^2(\theta)}{2g} \tag{12}$$

Expression (12) gives the maximum altitude $y_p$ of the projectile in its trajectory as a function of initial velocity $v_0$, barrel elevation angle $\theta$ and gravitational acceleration g. Under the constant gravitational acceleration assumption the trajectory will be symmetric and the total flight time $t_T$ of the projectile will be twice the value given in (9) which gives, $$t_T = 2 t_p = \frac{2 v_0 \sin(\theta)}{g} \tag{13}$$

Substituting (13) in (6) will give the projectile range $x_T$ as, $$x_T = v_0 t_T \cos(\theta) \tag{14}$$

Substituting (13) in (14) gives the range for a symmetric trajectory as, $$x_T = v_0 \left[ \frac{2 v_0 \sin(\theta)}{g} \right] \cos(\theta) \tag{15}$$

On the other hand from trigonometry the half angle formula gives, $$\sin(2\theta) = 2 \sin(\theta) \cos(\theta) \tag{16}$$

Substituting (16) in (15) will give the well-known range formula as, $$x_T = \frac{v_0^2 \sin(2\theta)}{g} \quad (17)$$

Another useful expression is to calculate the projectile trajectory as a function of x. This can be done by solving t in (6) in terms of x as, $$t = \frac{x(t)}{v_0 \cos(\theta)} \quad (18)$$

Substituting in (18) in (7) gives, $$y(t) = v_0 \frac{x(t)}{v_0 \cos(\theta)} \sin(\theta) - \frac{1}{2} g \left[ \frac{x(t)}{v_0 \cos(\theta)} \right]^2 \quad (19)$$

Simplifying (19) gives the well know parabolic relation of the trajectory as, $$y = x tg(\theta) - \frac{1}{2} g \frac{x^2}{v_0^2 \cos^2(\theta)} \quad (20)$$

As can be seen, Equations (17) or (20) do not have mass as a parameter in their formulation. However, when the drag force is included in the analysis there will be a dramatic difference. Accounting for this difference makes it possible to dramatically improve the accuracy of trajectory prediction, rendering the invention more useful.

Deceleration in a Media with Drag

In the analysis done above the air drag on the projectile is ignored. It is useful to see how the air drag will affect projectile velocity. First it is useful to start with an analysis of the motion of a projectile which has an initial velocity of $v_o$ and a mass of m in a media with drag and constant gravitational acceleration g. Newton's equation of motion expressed in terms of velocity v gives, $$m \frac{dv}{dt} = mg - \frac{1}{2} \rho C_D S v^2 \quad (21)$$

where m, $\rho$, $C_D$ and S are mass of the projectile/pod, air density, drag coefficient and cross-sectional area in the direction perpendicular to the motion, respectively. The right hand side of equation (21) has gravitational force and the force generated by the drag. The sign of the force generated by the drag is negative because the drag force acting upon the projectile for our problems for this application is in the opposite direction of its velocity vector and the gravitational force mg. If we assume there is no gravitational force, rearranging (21) gives, $$\frac{dv}{v^2} = -\frac{1}{2m} \rho C_D S dt \quad (22)$$

Integrating both sides gives, $$\int_{v_0}^{v} \frac{dv}{v^2} = -\frac{1}{2m} \rho C_D S \int_0^t dt \quad (23)$$

The integration will produce, $$\frac{1}{v_0} - \frac{1}{v} = -\frac{1}{2m} \rho C_D S t \quad (24)$$

which again with some arithmetic, Equation (24) becomes, $$-\frac{1}{v} = -\frac{1}{v_0} - \frac{1}{2m} \rho C_D S t \quad (25)$$

giving $$-\frac{1}{v} = -\frac{2m}{2mv_0} - \frac{v_0}{2mv_0} \rho C_D S t \quad (26)$$

Solving v from Equation (26) will result in, $$v(t) = \frac{2mv_0}{2m + v_0 \rho C_D S t} \text{ Or } v(t) = \frac{v_0}{1 + \frac{v_0 \rho C_D S}{2m} t} \quad (27)$$

By solving t from Equation (26) for a given v and $v_0$ we can calculate the time needed to bring the velocity of the projectile from $v_0$ to v as, $$t = \frac{2m}{v_0 \rho C_D S} \left[ \frac{v_0 - v(t)}{v(t)} \right] \quad (28)$$

As can be seen, introducing drag into the equation of motion will bring mass of the projectile, density of air and drag coefficient into the equation, along with other projectile/pod physical parameters such as its cross-sectional area.

Calculation of the Limit Velocity with the Parachute

A parachute is a simple and efficient way of slowing down the pod to a desired limit velocity $v_{lim}$ such that we can increase the video capture time of the target area and if desired perform a soft landing to the ground without damaging the electronics of the pod. A "radio Frequency Air Bridge may be used to extend the communication range of the pod according to the invention to furthest range of the munitions projectile. With the Radio Frequency Air Bridge a sequence of pods is able to transmit video and any other information even after landing, so it is a needed property for the implementation of the air bridge properly. The following is a procedure in accordance with the invention.

First calculate the required parachute area for a desired safe landing speed. Since the only forces acting on the pod is gravity and drag forces, the pod will reach its limit velocity when these forces will be equal, in other words when the derivative term in (21) becomes zero in Newton's equation of motion, the condition is, $$mg = \frac{1}{2} \rho C_D S v_{lim}^2 \quad (29)$$

Solving parachute area S from Equation (29) gives, $$S = \frac{2mg}{\rho C_D v_{lim}^2} \tag{30}$$

where m, $C_D$ and $v_{lim}$ are the mass of the pod, drag coefficient of the parachute and the desired limit velocity of decent, respectively. Using 2.1336 m/s as rate of decent, mass of 0.22 kg and a drag coefficient of 1.5, which corresponds to a half dome, Equation (30) gives 0.6971 $m^2$ of parachute area or a parachute radius of 0.471 meters. Some other drag coefficients which are related to this work are para sheet 0.75, sphere 0.47, half sphere 0.42, cone 0.5, cube 1.05, long cylinder 0.82 and streamline 0.04. A 40 mm illumination grenade parachute area is designed for 2.1336 m/s (7 feet/sec) of speed of descent, giving 40 seconds of hang time as calculated using Equation (30).

As can be seen, the parachute area is linearly proportional to mass. One of the reasons for designing the pod to be as light as possible so as to minimize the parachute area and thus enemy targeting cross section.

Since to many people, 2.1336 m/s of speed does not mean much, it is helpful to analogize. For comparison we calculate the "equivalent drop height" under the assumption of constant gravitational acceleration with zero air drag. Under constant gravitational acceleration the velocity as a function of time, starting from an initial velocity of zero is, $$v_{lim} = gt \tag{31}$$

Solving t from Equation (31) gives, $$t = \frac{v_{lim}}{g} \tag{32}$$

Height h is calculated under the assumption of no air drag, zero initial velocity and in constant gravitational acceleration, so height is, $$h = \tfrac{1}{2} g t^2 \tag{33}$$

Substituting Equation (32) in Equation (33) gives, $$h = \frac{1}{2} g \left(\frac{v_{lim}}{g}\right)^2 \tag{34}$$

With simplification of Equation (34), the equivalent drop height in terms of the limit velocity of 2.1336 m/s is, $$h = \frac{v_{lim}^2}{2g} = \frac{2.1336 \times 2.1336}{2 \times 9.81} = 0.232 \text{ m} \tag{35}$$

In other words 2.1336 m/s velocity is the equivalent of dropping the pod from 0.232 m of height to the ground, a value that can be visualized easily.

Acceleration of Projectile and Pod in a Gun Barrel

The most violent motion and highest acceleration to which the pod is subjected will be while it is traveling in the barrel. The acceleration of any projectile in the barrel has very large values, in the order of 5,000-40,000 g's. The acceleration depends mainly on the mass of the projectile, the propellant burn rate, propellant amount, temperature it produces and the barrel characteristics. Barrel characteristics are the elevation angle of the barrel, friction coefficient between the barrel and projectile, projectile geometry, density of air and the type of barrel, such as smoothbore or rifled. It is not a simple problem to solve accurately. Complex simulation capabilities are required, as found in the commercially available the "Gun Barrel" program product. The problem becomes even more complex when dealing with equations of motion for the projectile in rifled barrels due to the rotational motion of the projectile, which can be in the order of 300,000 rpm! But under the constant acceleration assumption one can obtain some ball park numbers which still will give results beyond expectations of those not familiar with this topic. It will be shown that the real g numbers are several times higher than the large values obtained by the constant acceleration assumption.

Under constant acceleration the distance traveled is given as written in (30). Replacing g with a it becomes, $$\tfrac{1}{2} a t^2 = b_l \tag{36}$$

where $b_l$ is the barrel length and a is the assumed constant acceleration of the projectile in the barrel. On the other hand we already know the muzzle velocity $v_0$ and again under constant acceleration, the velocity as a function of time, starting from an initial velocity of zero is, $$at = v_0 \tag{37}$$

Solving t from Equation (37) and substituting in Equation (36) gives, $$\frac{1}{2} a \left(\frac{v_0}{a}\right)^2 = b_l \tag{38}$$

This value $v_0$ from Equation (38) gives the constant acceleration in the barrel as, $$a = \frac{v_0^2}{2 b_l} \tag{39}$$

As an example, for 155 mm howitzer having muzzle length of 3.564 m, muzzle velocity of 563 m/s will give, $$a = \frac{563 \times 563}{2 \times 3.564} = 44{,}468.154 \text{ ms}^{-2} = 4{,}532.94 g \tag{40}$$

In reality the gas expands while it is pushing the projectile in the barrel, so its pressure will drop as a function of time, which is related to the projectile position in the gun barrel. Therefore acceleration can't be constant. It will decrease as the projectile moves in the barrel. Therefore the real acceleration in the barrel initially should be higher than given in (40). A more detailed analysis is needed for this situation.

Since the delivery platforms of the pods according to the invention are any artillery piece available, having an accurate number on the range of acceleration of the pod in the gun barrel is important. Therefore it is prudent to list the mechanical specifications on the pod itself, its "g reduction" enclosure and its electronics along with its optics. Use of the commercially available "Gun Barrel" product generates sufficiently accurate specifications such that the pod according to the invention can be accurately delivered in accordance with the invention.

Equation of Motion of the Projectile in the Gun Barrel

Assume that the propellant instantly turns into gas after detonation and has the initial volume of the powder chamber or the cartridge. This assumption mathematically gives an infinite burn rate for the propellant which is not exactly correct, but it establishes the upper bound for the acceleration of a projectile traveling in the gun barrel and is a good starting point for dealing with the problem with better accuracy as compared with the assumption of constant acceleration. Also assume that the gas remains at the same temperature until the projectile leaves the barrel. The air resistance, which is quadratically related to the projectile velocity in the gun barrel as given by the third term, and the friction between the gun barrel and the projectile, which is represented by the fourth term from the left in relation (46), are the only forces acting upon the projectile against its direction of motion in the gun barrel.

Figure 3A:
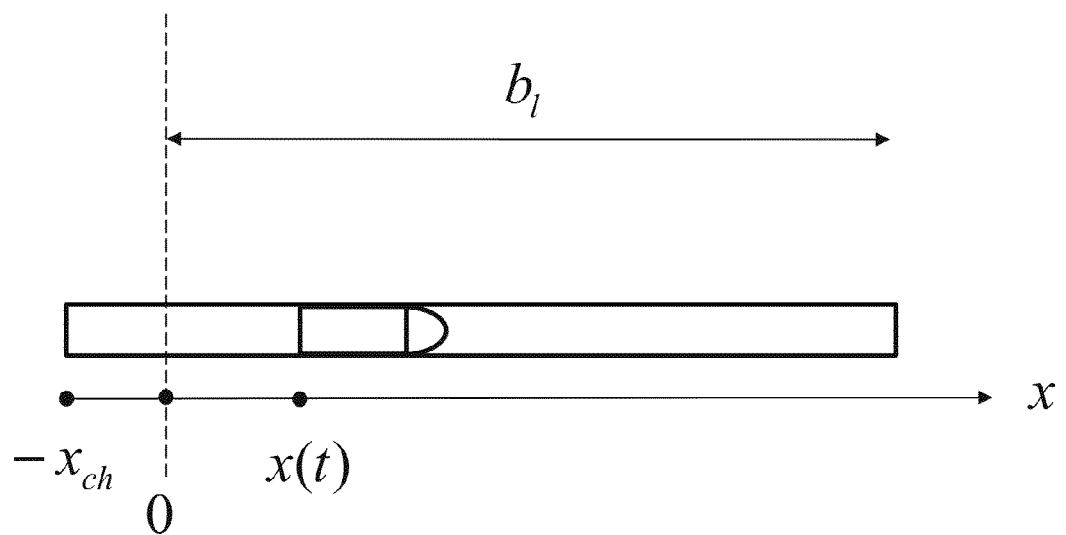
FIG. 3A is a schematic top view of a projectile in a launch barrel for zero barrel elevation angle.
Figure 3B:
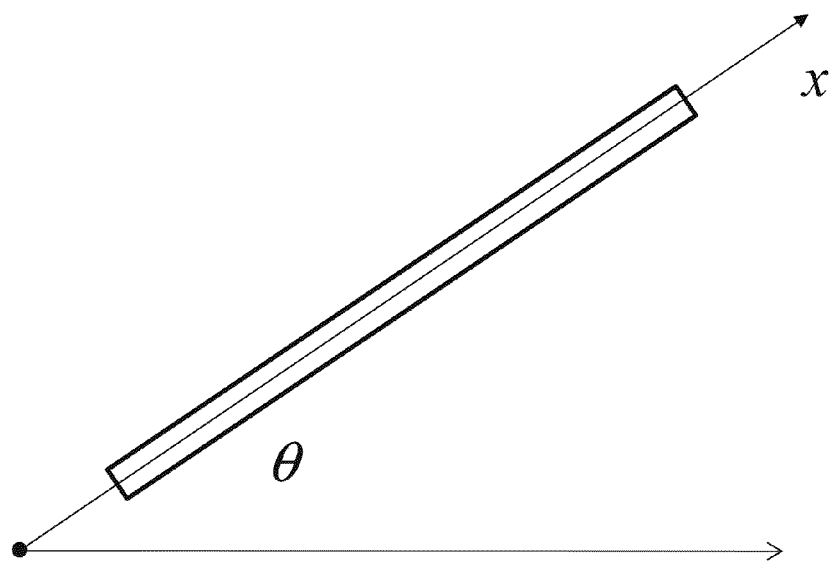
FIG. 3B is a schematic side view of a projectile in a launch barrel for barrel elevation angle of θ.

Also assume the powder chamber has the same diameter as the barrel. As shown in FIG. 3A and FIG. 3B, when the pod, or the projectile that contains the pod, travels along the barrel, the gas volume increase as, $$V(t) = \pi r^2 [x(t) + x_{ch}] \quad (41)$$

where $x_{ch}$ and r represent the powder chamber length and the radius of the barrel respectively. The change in the gas volume will cause a decrease in pressure, which is represented by the well-known ideal gas law as, $$PV = nRT \quad (42)$$

where P, V, n, R and T are the gas pressure, volume, mole number and temperature in degrees Kelvin, respectively. If $P_0$ is the initial pressure of the gas and if we assume that the gas temperature does not change as it expands (a simplification), the gas pressure generated by the propellant as a function of time is represented as, $$P(t) = \frac{P_0}{\pi r^2 [x(t) + x_{ch}]} \quad (43)$$

On the other hand the force acting upon the projectile due to the gas pressure is, $$F(t) = SP(t) = \pi r^2 P(t) \quad (44)$$

where S is the cross-sectional area of the circular barrel, which is taken equal to the projectile cross-sectional area. Substituting Equation (43) in Equation (44) will give the force as, $$F(t) = \pi r^2 \frac{P_0}{\pi r^2 [x(t) + x_{ch}]} = \frac{P_0}{x(t) + x_{ch}} \quad (45)$$

The equation of motion of the projectile which includes the drag force, friction and mass is written as, $$F(t) - mg \sin(\theta) - \frac{1}{2} \rho C_{DB} S v^2 - f \frac{dx}{dt} = m \frac{d^2 x}{dt^2} \quad (46)$$

where m, g, θ, ρ, $C_{DB}$, S, v, f are mass of the projectile, gravitational acceleration, barrel angle with respect to x axes, air density in the barrel, drag coefficient of the projectile in the barrel, barrel cross-sectional area, its velocity and friction coefficient between the projectile and the barrel, respectively. The drag term is far more complicated than given here and will have much higher values for the same speed compared to the drag force in free air. The reason for that is the projectile is not moving in free air, it is actually pushing the air in front of it in the barrel while moving at supersonic speeds and obeys a lot more complex laws of aerodynamics requiring mass transport, shock wave and many other complex effects. Since we are interested in finding the upper bound of acceleration of the projectile in the gun barrel, assuming a larger drag coefficient compared to the drag coefficient used in the trajectory is sufficient for this work.

The ordinary differential equation (46) cannot be solved analytically, therefore numerical solution is required. The "Gun Barrel" program performs this task. The velocity and acceleration as a function of time or as a function of the projectile can be calculated directly from the solution using the known relations of acceleration a and velocity v as, $$v = \frac{dx}{dt} \text{ and } a = \frac{dv}{dt} = \frac{d^2 x}{dt^2} \quad (47)$$

Figure 4:
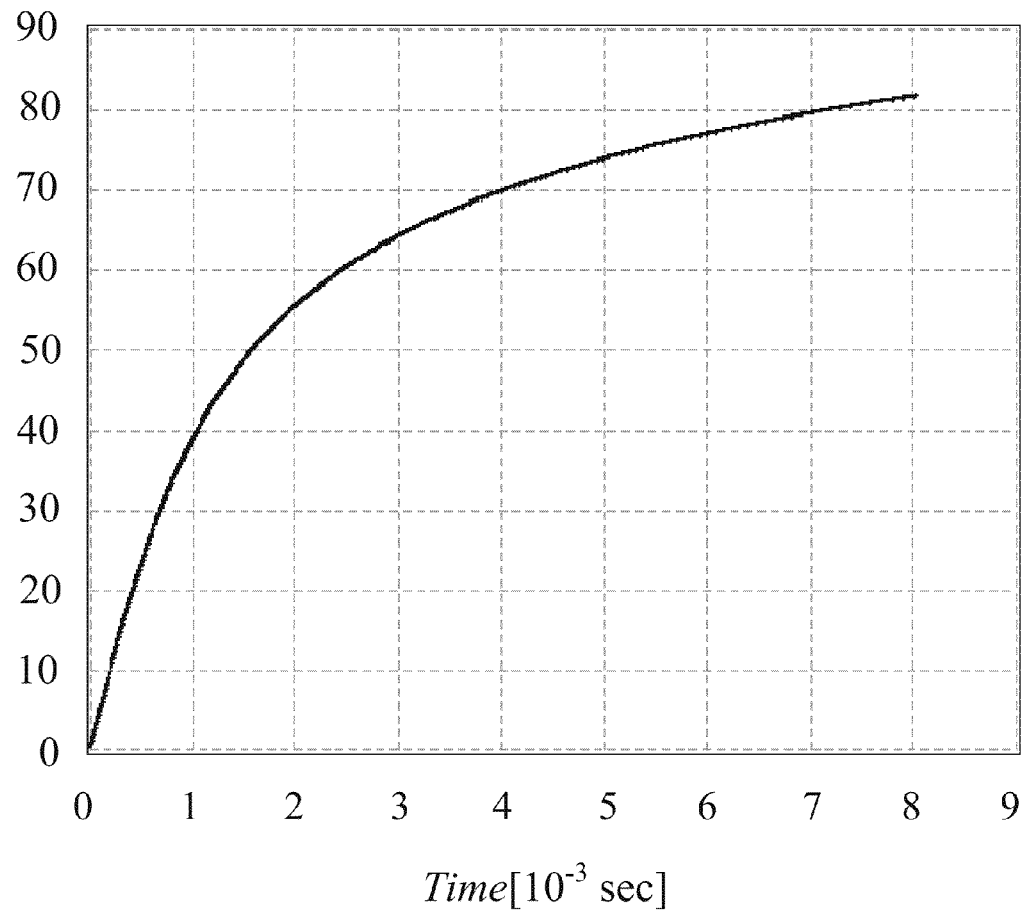
FIG. 4 is a graph illustrating velocity versus time of a projectile having characteristics of a 40 mm grenade or a projectile in the barrel of M203 grenade launcher according to the invention.
Figure 5:
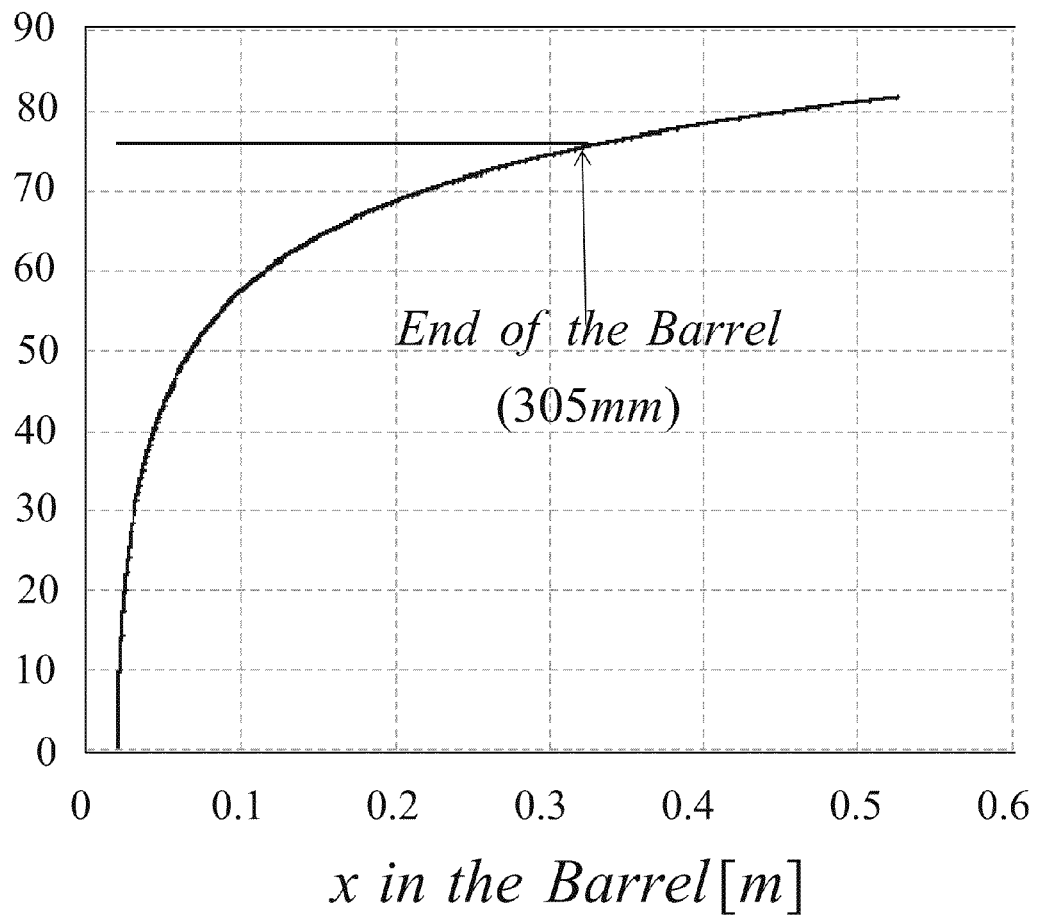
FIG. 5 is a graph illustrating velocity of a projectile versus barrel length of a projectile having characteristics of a 40 mm grenade or a projectile in the barrel of M203 grenade launcher according to the invention.
Figure 6:
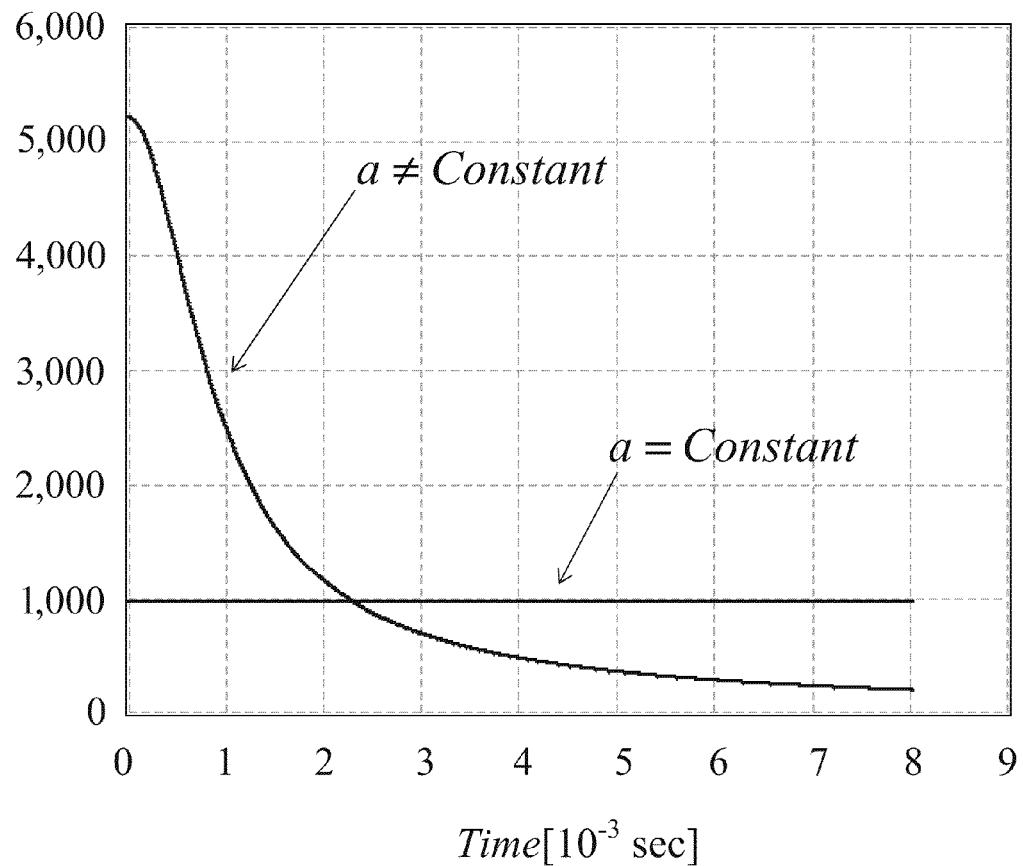
FIG. 6 is a graph illustrating g-force versus time for two types of launch characteristics of a projectile having characteristics of a 40 mm grenade or a projectile according to the invention.
Figure 7:
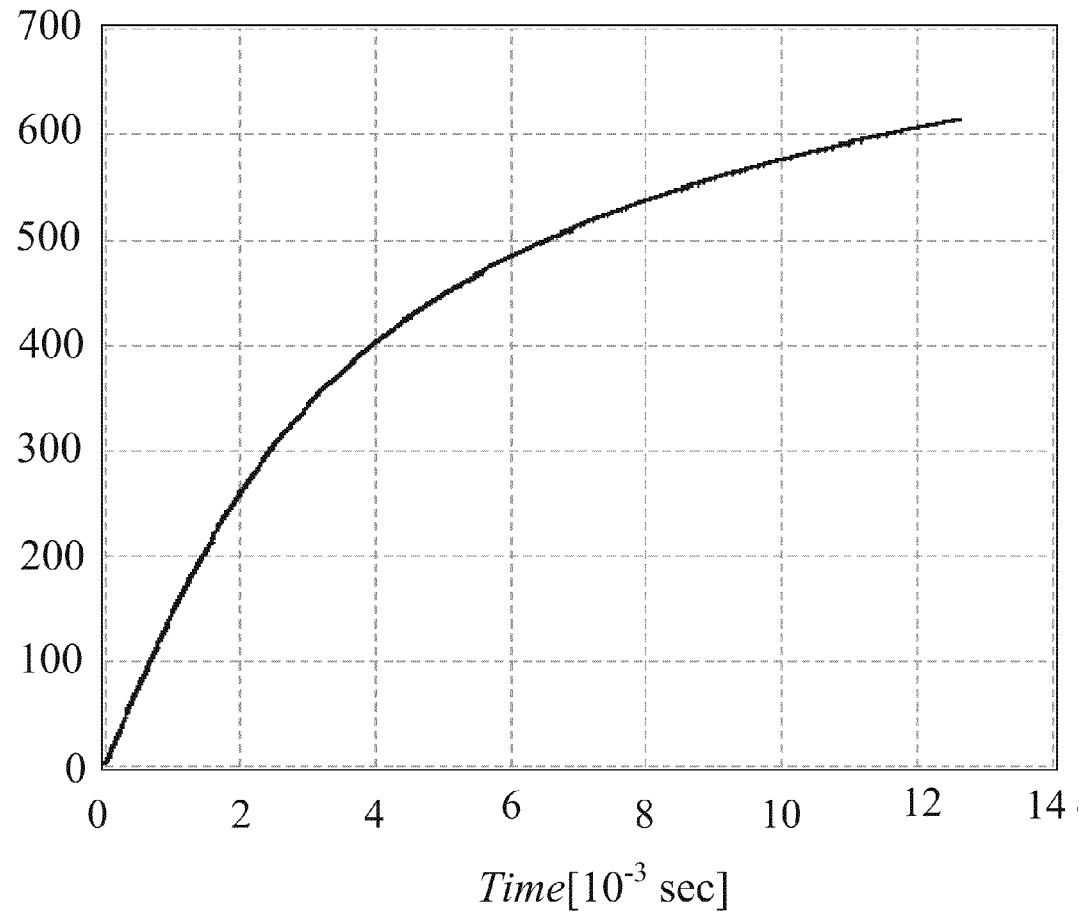
FIG. 7 is a graph illustrating velocity of a projectile versus time of a projectile having characteristics of a 155 mm a projectile in the barrel of L23 gun according to the invention.
Figure 8:
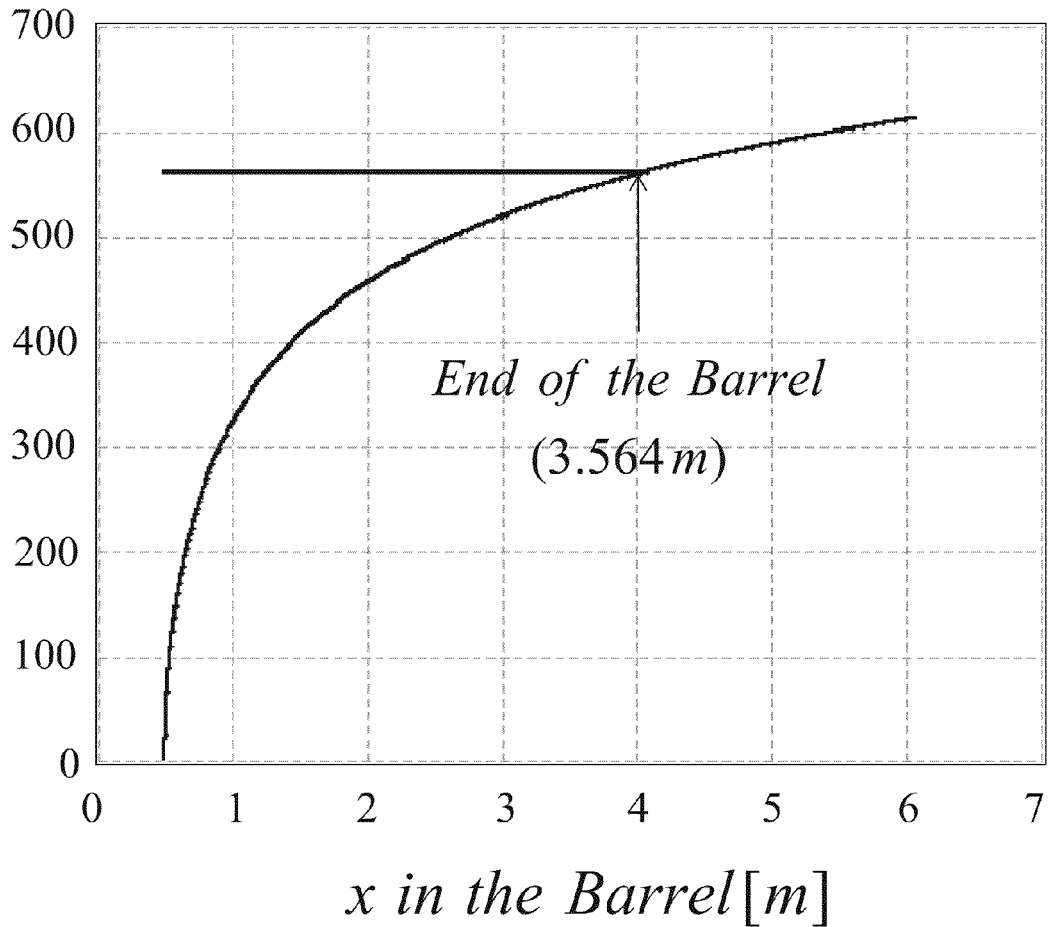
FIG. 8 is a graph illustrating velocity of a projectile versus barrel length of a projectile having characteristics of a 155 mm a projectile in the barrel of L23 gun according to the invention.
Figure 9:
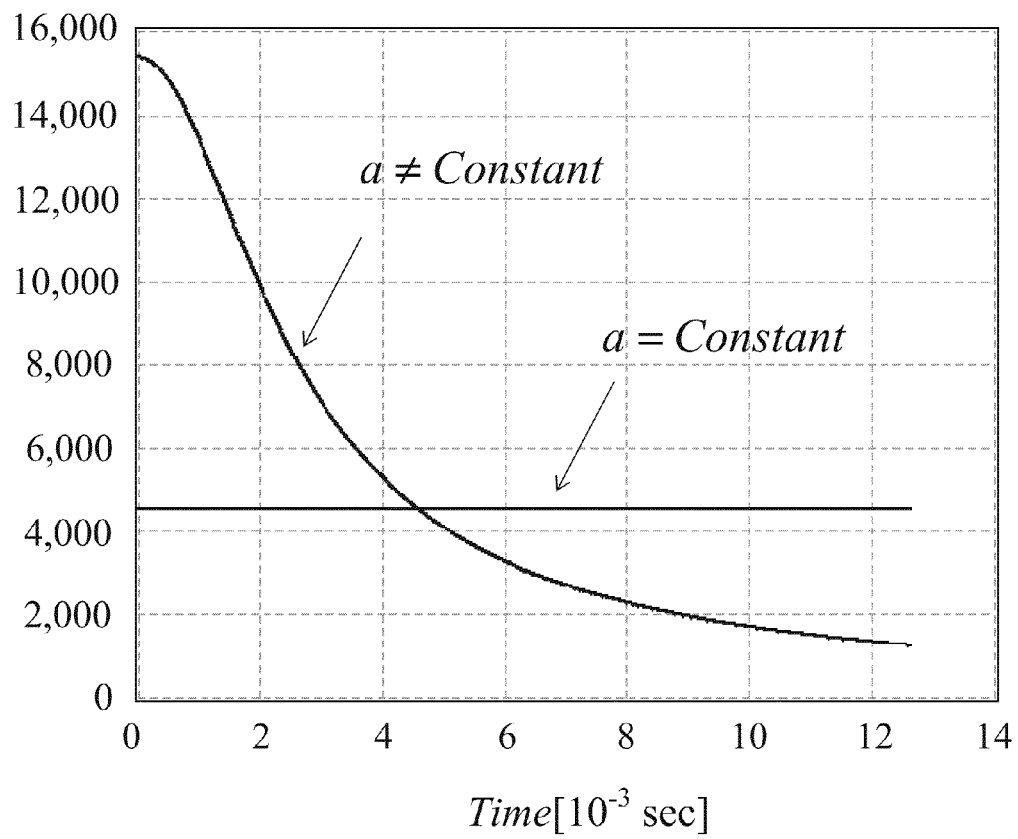
FIG. 9 is a graph illustrating g-force versus time for two types of launch characteristics of a projectile having characteristics of a 155 mm a projectile in the barrel of L23 gun according to the invention.

The "Gun Barrel" program produced the results shown in the illustrative graphs. FIG. 4 is a graph that shows the velocity of the pod as a function of time during its launch from the 40 mm M203 grenade launcher which has a barrel length of 305 mm. FIG. 5 is a graph that shows the projectile velocity as a function of the barrel length, which reaches the muzzle velocity of 72 m/s for a 0.22 kg grenade. As can be seen the projectile reaches its muzzle velocity at the end of the barrel. FIG. 6 is a graph that shows the projectile acceleration as a function of time. The peak acceleration exceeding 5,000 g is at the time of detonation. The straight line in FIG. 6 shows the acceleration as if under constant acceleration to show the clear differences. As can be seen, the "Gun Barrel" program gives valuable information related to the length of the gun barrel versus muzzle velocity, among many other things which is very important in gun design. FIGS. 7-9 are graphs showing the information for the L23 155 mm howitzer firing 43 kg of HE round with the barrel length of 3.564 m. Muzzle velocity for this case is 563 m/s, giving a maximum range of 14,600 m. As can be seen for both cases, there is a fairly large difference between the constant acceleration assumption and more realistic assumptions applied to the equation of motion. It is fair to say the maximum actual acceleration of any projectile is in the order of 3 to 5 times higher than the calculated values obtained with a constant acceleration assumption.

One also may consider the 120 mm tank guns for use as delivery platforms according to this invention. A smoothbore 120 mm tank gun such as the Rheinmetall L/55 gun with a 6.6 m barrel length which is employed in the USA M1A1, the Leopard 2 and many other modern tanks have muzzle velocities in the order of 1,750 m/s. (That is more than twice the muzzle velocity of the best World II tank guns.) Modern tank guns will give acceleration in the order of 30,000 g's, and the pod and its electronics of the invention must be able to survive such g forces.

Formulation of the Trajectory and Release Time Calculations Using "Ballistic" Program As demonstrated in the two examples earlier, ignoring the drag forces gives very different results in acceleration and velocity. The same holds true for the trajectory calculations for any projectile. The OEA International "Ballistic" program product provides more accurate results because it takes into account many more effects into its simulations, such as earth's rotation, its exact geoid shape, the dependency of the g value on the GPS coordinates of the gun position, altitude, the speed and bearing of the gun platform, as well as its tilt from the true horizontal plane. It also calculates the probability of hitting a given target coordinates determined by its given three-dimensional shape, bearing and speed based on the statistical variations of all the parameters affecting the projectile trajectory. The "Ballistic" program may be used with this invention to obtain can accurate trajectory prediction, which is required for calculation of the proper release times of the pods for a desired video reconnaissance of a given location as determined by accurate GPS coordinates relative to a given gun position. Herein only the outputs needed for the work are given.

The trajectory calculations can be formulated using Newton's law for motion as done above. If the tilt of the gun is taken into consideration, Newton's law for motion of the projectile will give a three dimensional formulation. Here we assume that the gun is sitting on a plane that is a level tangent to the surface of the earth. This assumption reduces the problem into a two-dimensional problem. Assuming that the projectile is following the tangent of the trajectory, the force generated due to the air drag in vector formulation in two dimensions can be given as, $$\vec{F}_D(t) = -\frac{1}{2}\rho C_D S |\vec{v}(t)|^2 \vec{v}(t) \frac{1}{|\vec{v}(t)|} \quad (48)$$

The symbols in Equation (48) are the same as given earlier. The velocity along x and y axes are given as, $$v_x = \frac{dx}{dt} \text{ and } v_y = \frac{dy}{dt} \quad (49)$$

which gives the velocity vector used in (48) as, $$\vec{v}(t) = v_x \vec{i} + v_y \vec{j} = \frac{dx}{dt}\vec{i} + \frac{dy}{dt}\vec{j} \quad (50)$$

where i and j are unit vectors along x and y axes respectively. The magnitude of the velocity vector v becomes, $$|\vec{v}(t)| = \sqrt{v_x^2(t) + v_y^2(t)} \quad (51)$$

The negative sign shows that the drag force vector is opposite direction to the unit velocity vector which is given by, $$\vec{u}_v(t) = \vec{v}(t)\frac{1}{|\vec{v}(t)|} \quad (52)$$

Thus the drag force can be written in terms of its x and y vector components as, $$\vec{F}(t) = f_x \vec{i} + f_y \vec{j} \quad (53)$$

which are explicitly written as, $$\vec{F}_x(t) = -\frac{1}{2}\rho C_D S \sqrt{\left(\frac{dx}{dt}\right)^2 + \left(\frac{dy}{dt}\right)^2} \frac{dx}{dt}\vec{i} \quad (54)$$

and, $$\vec{F}_y(t) = -mg - \frac{1}{2}\rho C_D S \sqrt{\left(\frac{dx}{dt}\right)^2 + \left(\frac{dy}{dt}\right)^2} \frac{dy}{dt}\vec{j} \quad (55)$$

The right hand side of the Newton equation of motion also has two vector components that are related to the acceleration and are given as, $$f_x(t) = m\frac{d^2x}{dt^2} = m\frac{dv_x}{dt} \quad (56)$$

and $$f_y(t) = m\frac{d^2y}{dt^2} = m\frac{dv_y}{dt} \quad (57)$$

which are derived by the use of the following well known relations for each of the velocity components along x and y axes, $$\frac{dx}{dt} = v_x \quad (58)$$

and $$\frac{dy}{dt} = v_y \quad (59)$$

On the other hand the initial conditions are, $$x(0)=x_0, y(0)=y_0, v_x(0)=v_0 \cos(\theta), v_y(0)=v_0 \sin(\theta) \quad (60)$$

which are the gun elevation θ and muzzle velocity $v_0$. The tangent of the trajectory respect to the x axes is basically determined by the velocity vector components as, $$\theta(t) = tg^{-1}\left(\frac{v_y(t)}{v_x(t)}\right) \quad (61)$$

The numerical solution methods such as the Euler method or the 4$^{th}$ order Runge-Kutta method require systems of equations to be written in terms of the first derivatives of its variables. Employing Equations (58) and (59) in (54-57) brings it to the required form of, $$\frac{dv_x}{dt} = -\frac{1}{2m}\rho C_D S \sqrt{\left(\frac{dx}{dt}\right)^2 + \left(\frac{dy}{dt}\right)^2} \frac{dx}{dt} \quad (62)$$

and, $$\frac{dv_y}{dt} = -g - \frac{1}{2m}\rho C_D S \sqrt{\left(\frac{dx}{dt}\right)^2 + \left(\frac{dy}{dt}\right)^2} \frac{dy}{dt} \quad (63)$$

Figure 10:
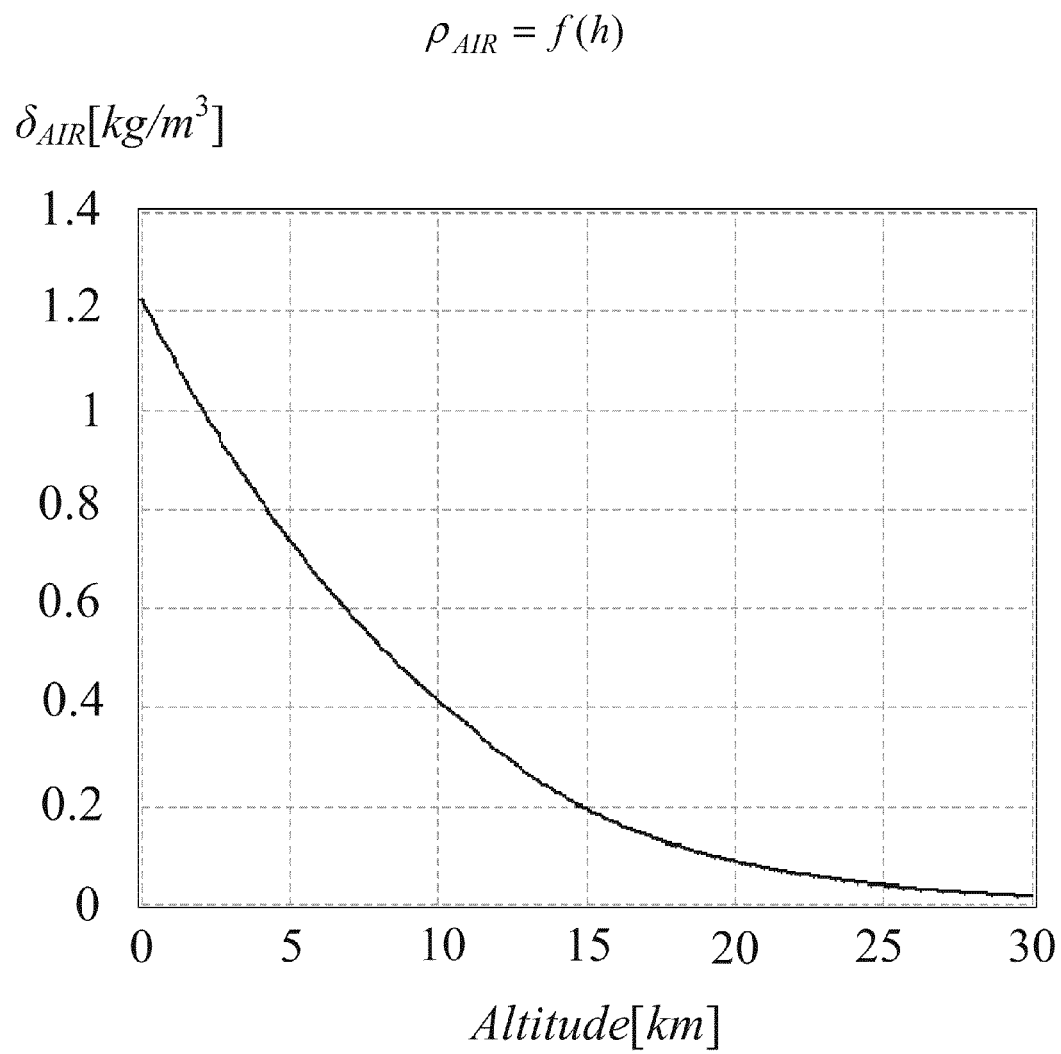
FIG. 10 is a graph illustrating air density versus altitude that is useful in understanding the trajectories of high altitude projectiles.

Air density is a function of temperature, humidity and altitude. FIG. 10 shows the air density variation above sea level with altitude. For high altitude trajectories, such as those of long range projectiles, this has to be taken into consideration. Similar and even more complex equation of motion simulations are given in FIGS. 9-11.

Figure 11:
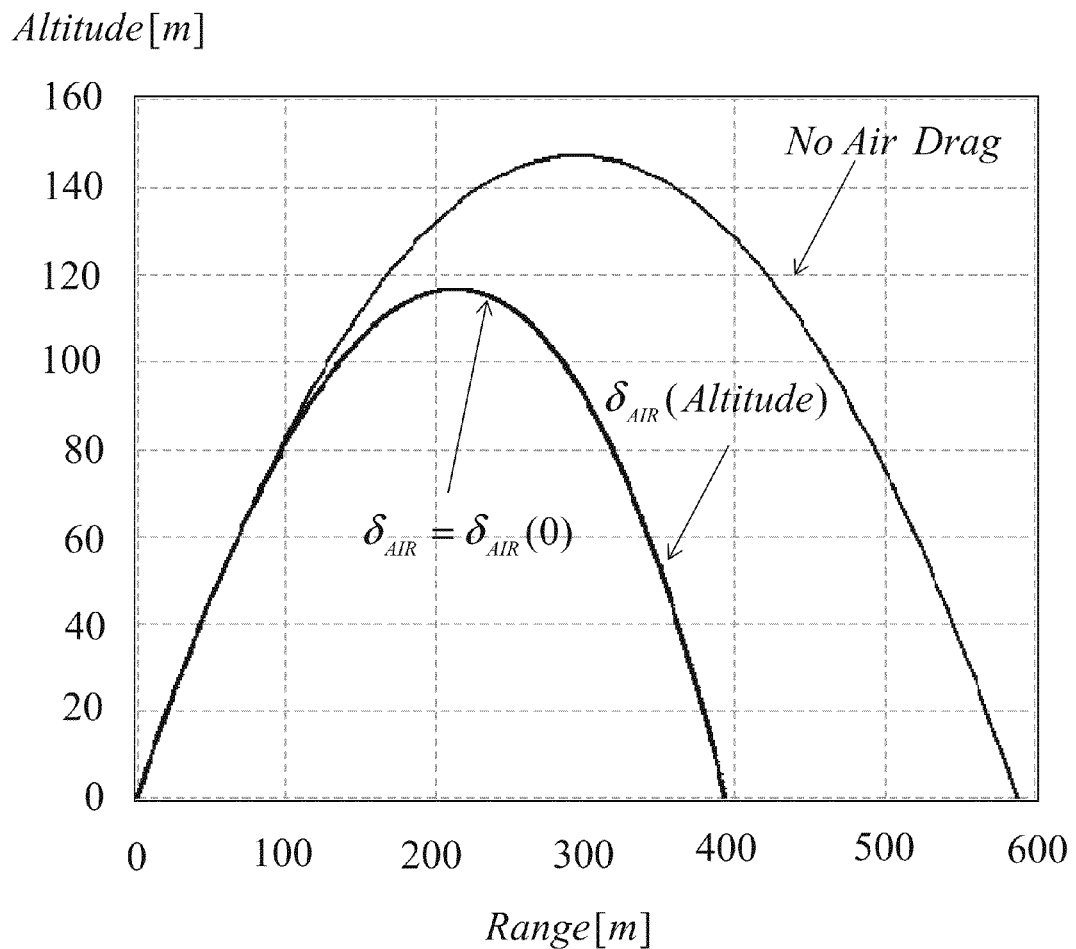
FIG. 11 is a graph illustrating a grenade trajectory over a range of air densities.

FIG. 11 shows the 40 mm grenade trajectory under various conditions, namely with no air drag, with the air drag and with the assumption that the air density air is constant with its sea level value and with its density taken as a function of altitude deployed at sea level with a 45° of barrel elevation launched from M203 grenade launcher with 72 m/s of muzzle velocity. Since the maximum altitude is only 100 m above the launch altitude, altitude effect is negligible and not visible.

Figure 12:
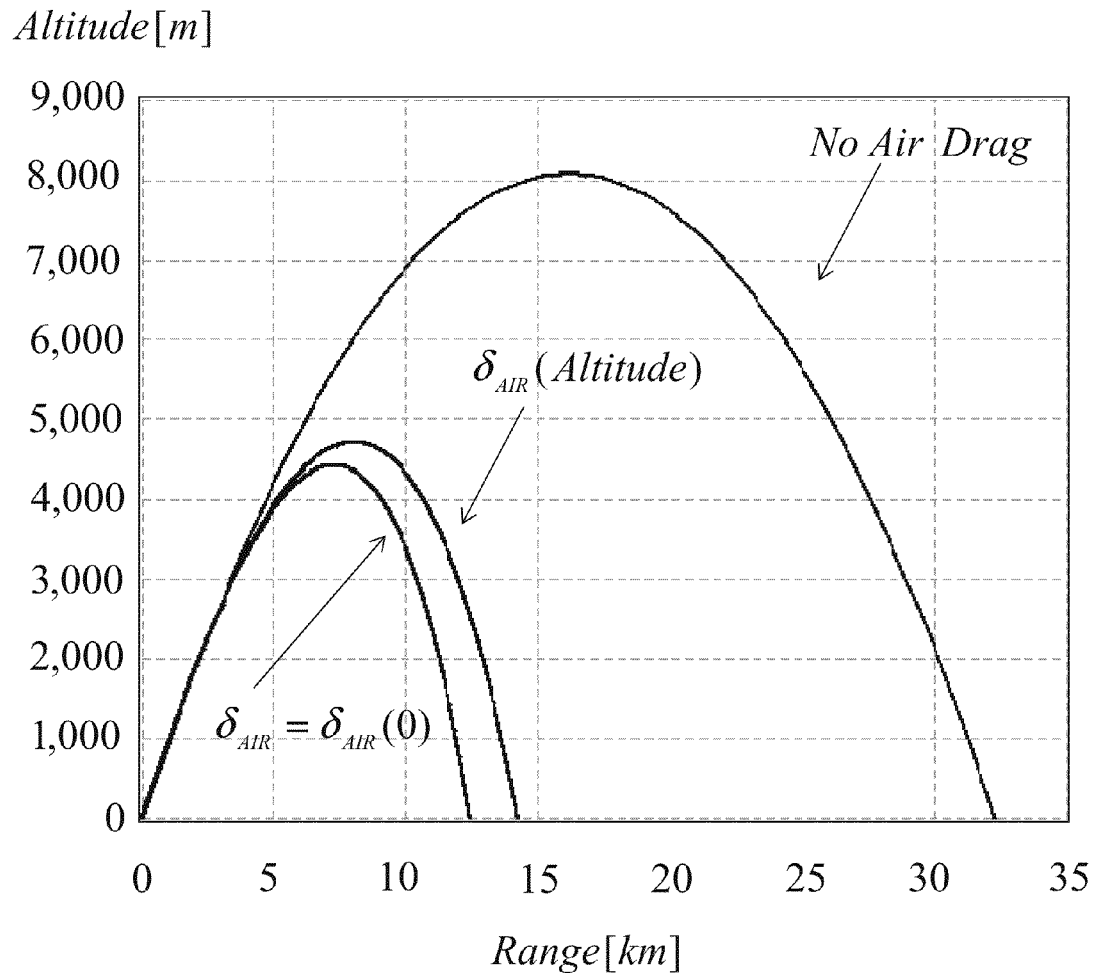
FIG. 12 is a graph illustrating a conventional or compatible 155 mm projectile trajectory over a range of air densities.
Figure 13:
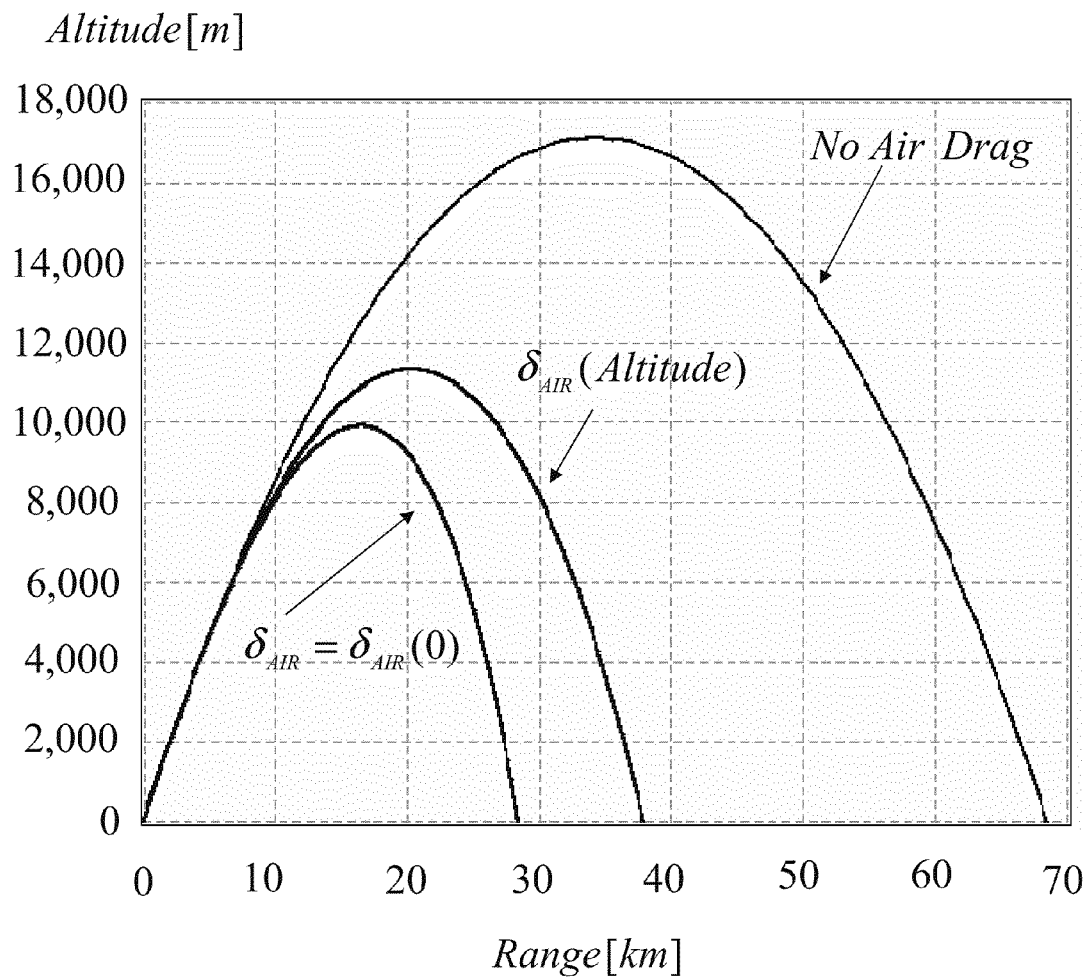
FIG. 13 is a graph illustrating a conventional or compatible 16 inch projectile trajectory over a range of air densities.
Figure 14:
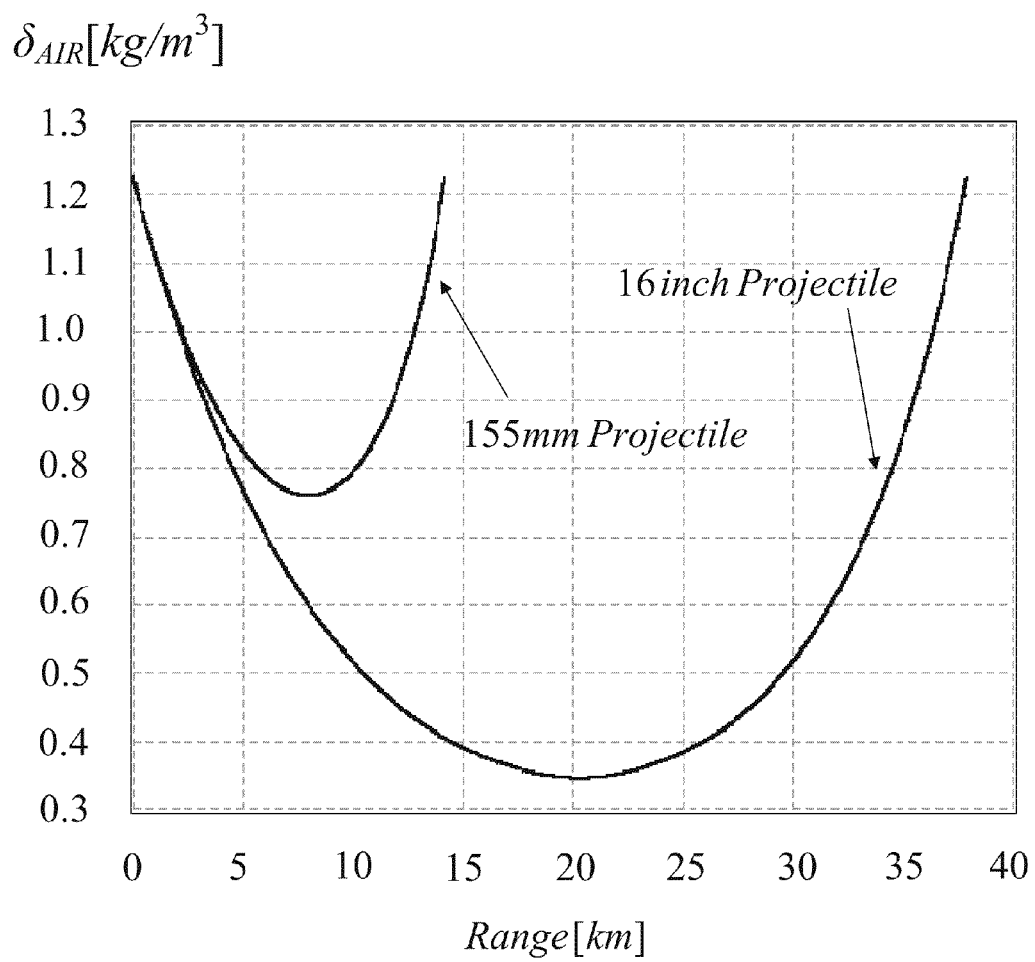
FIG. 14 is a graph illustrating air densities along the trajectory of a conventional or compatible 16 inch projectile and a 155 mm projectile over a range of air densities.
Figure 15:
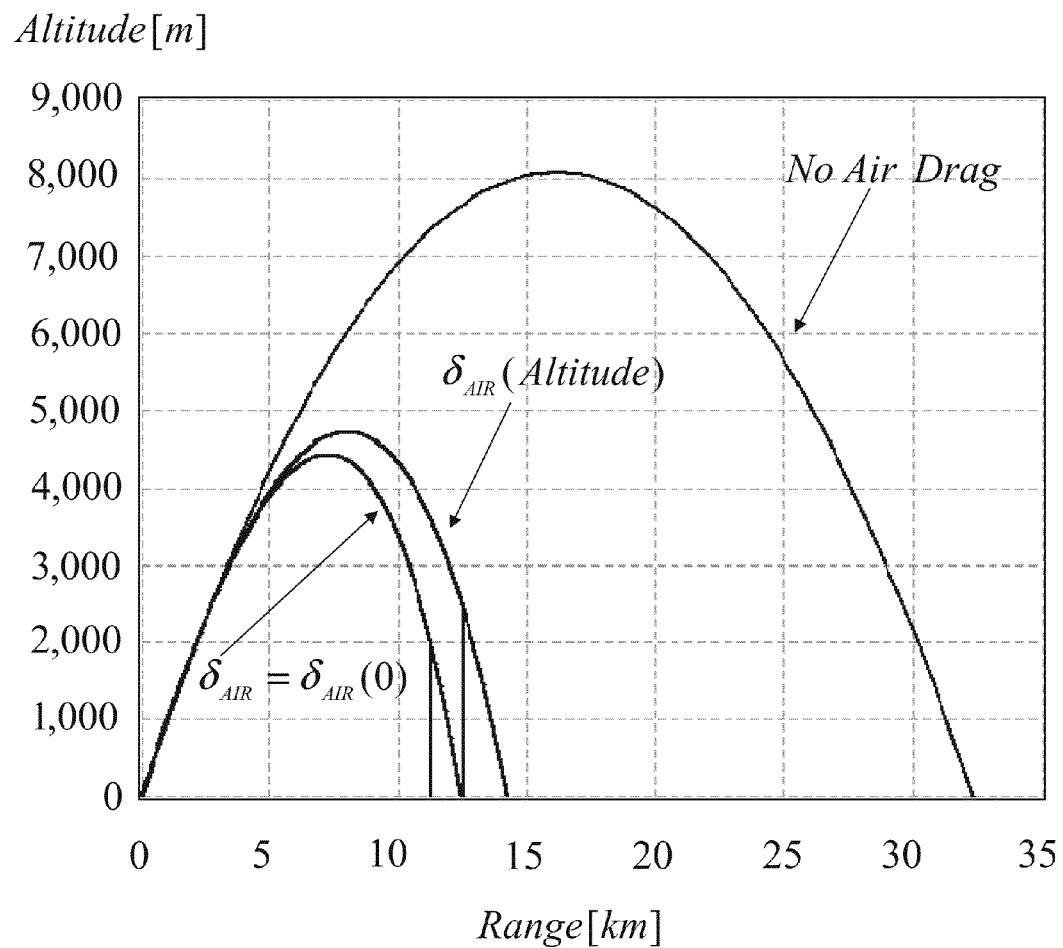
FIG. 15 is a graph illustrating a conventional or compatible 155 mm projectile trajectory over a range of air densities with and without parachute deployment.

A similar cooperative plot shown in FIG. 12 shows a 155 mm 43 kg HE round fired from the L23 with barrel elevation of 45° and 563 m/s of initial velocity. The third extreme is the illustration in FIG. 13, which shows the trajectories of an 862 kg armor-piercing round fired from a 406 mm (16 inch) naval gun with a barrel elevation of 45° and 820 m/s of initial velocity. FIGS. 11-13 illustrate the impact of air drag in the trajectory simulations. FIG. 14 show the air density variation for the projectile trajectories fired with 45° barrel elevation for the 155 mm L23 and 16 inch naval gun. For this invention, high gun elevation angles are much more suitable than low gun elevations, and simulations show that the air density variation with altitude must be included in the ballistic simulations to be able to determine an accurate trajectory. FIG. 15 shows the projectile trajectories fired with 45° barrel elevation for the 155 mm L23 including their parachute descent released at 50 seconds after firing for air density assumed to be a constant and as a function of altitude along the trajectory and with no air drag formulation. Since the no air drag assumption is so far off from the reality, the actual pod descent trajectory is not shown in curve A.

All of the comparative plots show the need for an accurate ballistic simulator for determining the release times of the pods for a desired video reconnaissance of a given GPS coordinate or range as well as their parachute descends.

Stages of the Pod Trajectory and its Video Coverage Area

There are two simulation cases that through comparison show their differences and their use to demonstrate the value of this invention as well as its feasibility. The first one is related to the 155 mm L23 howitzer-launched capsule enclosing pods and the second is the M203-launched 40 mm pod.

155 mm L23 Launched Capsule Simulation Results

In the case of the L23 launched capsule, it will be delivered from a gun platform with high velocity towards the target. In its initial stage it will follow the normal trajectory of a ballistic projectile. The pod is ejected with a spring, high pressure or small explosive charge in the opposite direction of the velocity of the delivery projectile as shown in FIGS. 13-15 for ejection of sub-munitions. From the space, weight and simplicity considerations the most efficient ejection mechanism is using a small explosive charge like those used in the air bags in cars. For a short time, which is programmable, the pod will continue its motion with initial conditions determined by the delivery trajectory and its parameters at the time of ejection. This stage is called "free fall" stage and is set to 1 second in the simulations. The purpose of the "free fall" stage is to give enough separation distance between the pod and the delivery projectile before the parachute of the pod is deployed. FIG. 15 shows the trajectory of the pod after it has been launched, with and without air drag or with air density taken as a function of altitude. As can be seen in all of the simulation cases the pod will be descending to the surface of the earth almost perpendicularly during its parachute assisted descent.

Figure 16:
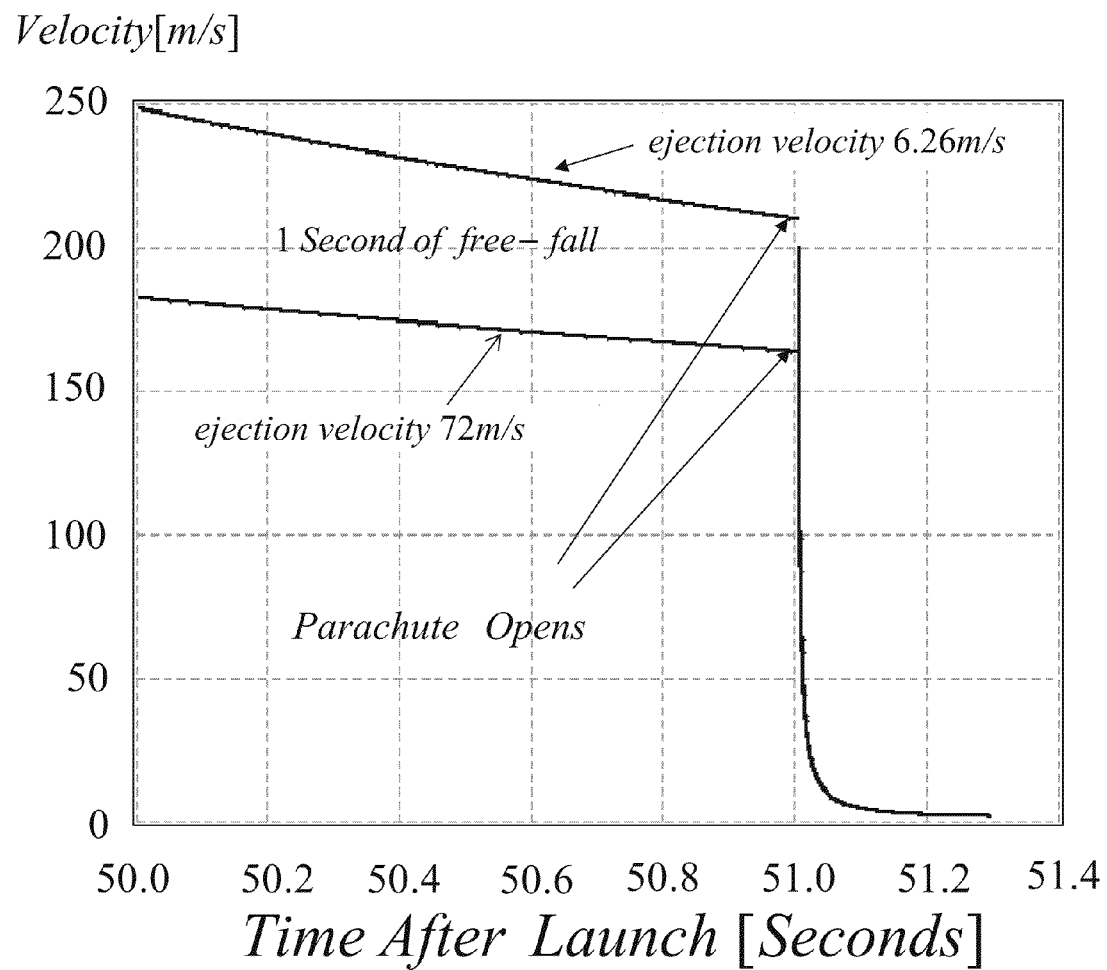
FIG. 16 is a graph illustrating the trajectory of a pod according to the invention launched from an L23 cannon after ejection at a pair of ejection velocities.

The initial portion of the period illustrated in FIG. 16 shows the velocity of the pod after its release time of 50 seconds with two different ejection velocities of 6.26 m/s and 72 m/s respectively, for the 1 second of free fall time before the parachute opens. At the ejection time the projectile velocity, altitude and range from the launch position are 254 m/s, 2,590 m and 12,400 m respectively. Ejection velocity of 6.26 m/s corresponds to the height of 2.5 m when the pod is ejected from the ground vertically. Ejection velocity of 72 m/s is basically the muzzle velocity of the M203 40 mm grenade launcher which can be thought of as the maximum practical ejection velocity that can be achieved in the system. In both of the cases the pod is ejected from the back side of the delivery projectile. Since the direction of the ejection is in the opposite direction of the projectile motion, the pod velocity respect to the coordinate system will be the difference between the projectile velocity and the ejection velocity.

As can be seen in FIG. 16 the pod slows down approximately 20 m/s during this free fall and will experience a very rapid slow down when the parachute is deployed. In less than approximately 0.3 seconds it will almost reach its limit velocity of 2.1336 m/s (7 feet/sec). During this simulation it is assumed that parachute deploys immediately and it reaches its final shape. This is not a realistic assumption but it shows very important issues with the pod design, which can be clearly seen in FIG. 17 where the deceleration as a function of time is shown. As can be seen the pod, parachute and its chords will experience a deceleration in the order of 9,406 g and 5,760 g for ejection velocities of 6.26 m/s and 72 m/s! These kinds of large forces can rip the parachute and its chords. The reason for this very high g force is its very high initial velocity giving very large drag force acting upon its small mass of 0.22 kg which is given explicitly, assuming no gravitational term in the right hand side of Equation (21). As can be seen from the solution of Equation (21) the deceleration will quadratically depend on the velocity and be inversely proportional to the mass of the pod.

In reality the parachute will take some time to open to its full shape and size and will result in smaller g forces, but it still will be too large. Neither the parachute deployment time nor the area of the parachute as a function of time can be predicted accurately, and they will have very large variations, so it cannot be simulated accurately. There are retarded bombs for air delivery which employ parachute, ballute or drag-inducing petals, but they have a large mass compared to the pod. Their release velocities are much less than 200 m/s for a low level ground attack where they are used. To be deterministic, a mechanical air brake needs to be employed to eliminate the uncertainties of the parachute deployment stage of the pod with much smaller area compared to the parachute. Furthermore this mechanical braking system can be used for the parachute deployment as well as reducing the g forces even more by using some of its energy for parachute deployment.

The pod 10/100 is equipped with spring activated drag surfaces 30, 32 which open up after they are released as in the similar retractable air brake retarded bombs. To reduce the g forces to a manageable level before the parachute opens, the air brake surface area should be an equivalent to a circle with a radius of 20.1 mm, which is easy to achieve in the pod. Addition of this small retractable air brake surface area will give 50 m/s limit velocity to the pod. The mechanism is also used for deploying the parachute by pulling the parachute out of its housing, and it reduces the spin of the pod if fired from a rifled barrel.

Figure 17:
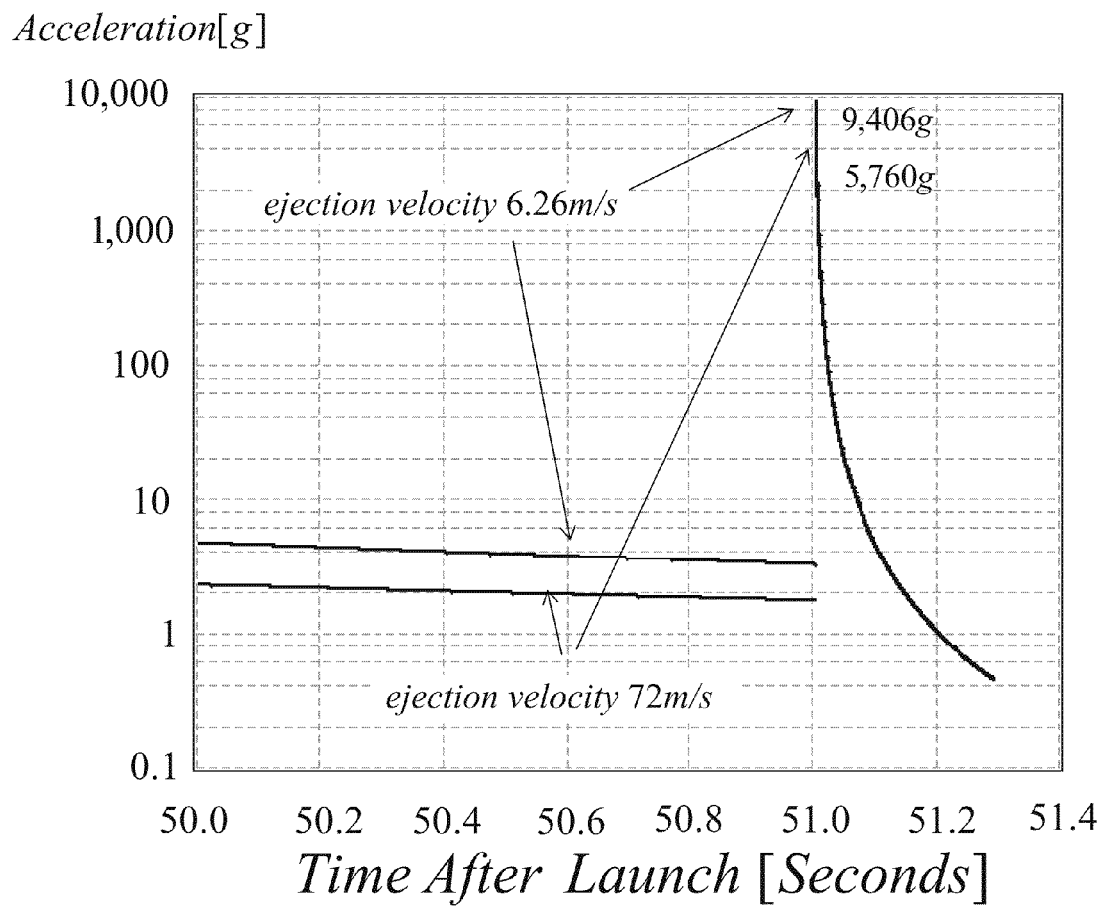
FIG. 17 is a graph illustrating the g-forces on a pod according to the invention launched from an L23 cannon after ejection at a pair of ejection velocities.
Figure 18:
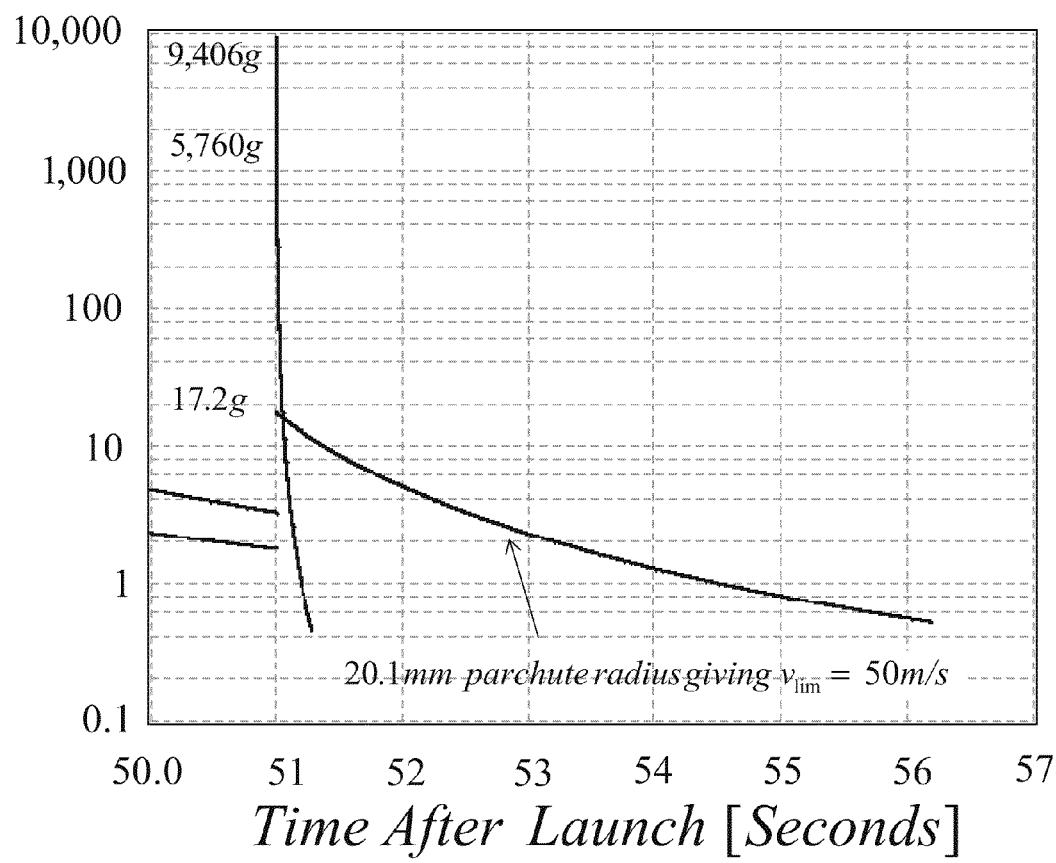
FIG. 18 is a graph illustrating the g-forces on a pod with and without air brakes according to the invention launched from an L23 cannon after ejection at a pair of ejection velocities.

FIG. 18 shows the deceleration of the pod as a function of time with the air brake, for an ejection velocity of 6.26 m/s superimposed with the deceleration curve derived from FIG. 17. As can be seen, with the air brake deployment, the initial deceleration will be 17.2 g and after 5 to 6 seconds the parachute can be deployed with no harm to it and its cords.

Figure 19:
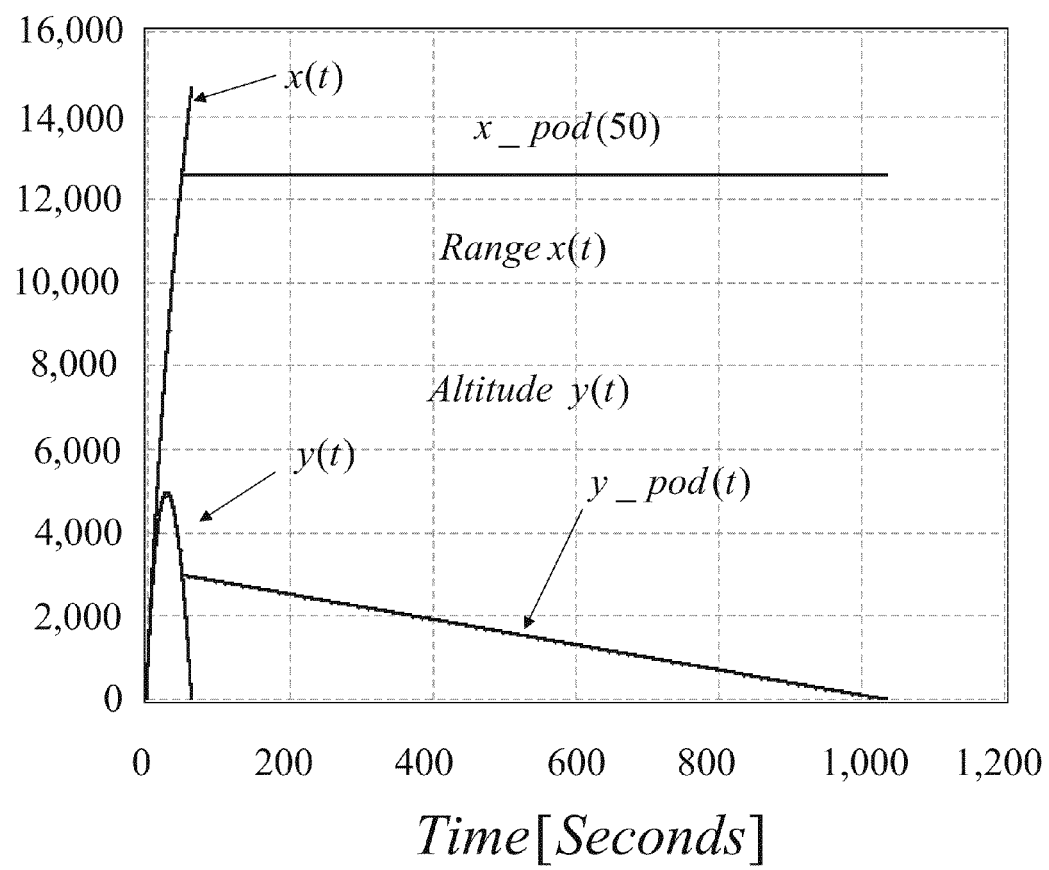
FIG. 19 is a graph illustrating altitude and range of a pod according to the invention launched from an L23 cannon.
Figure 20:
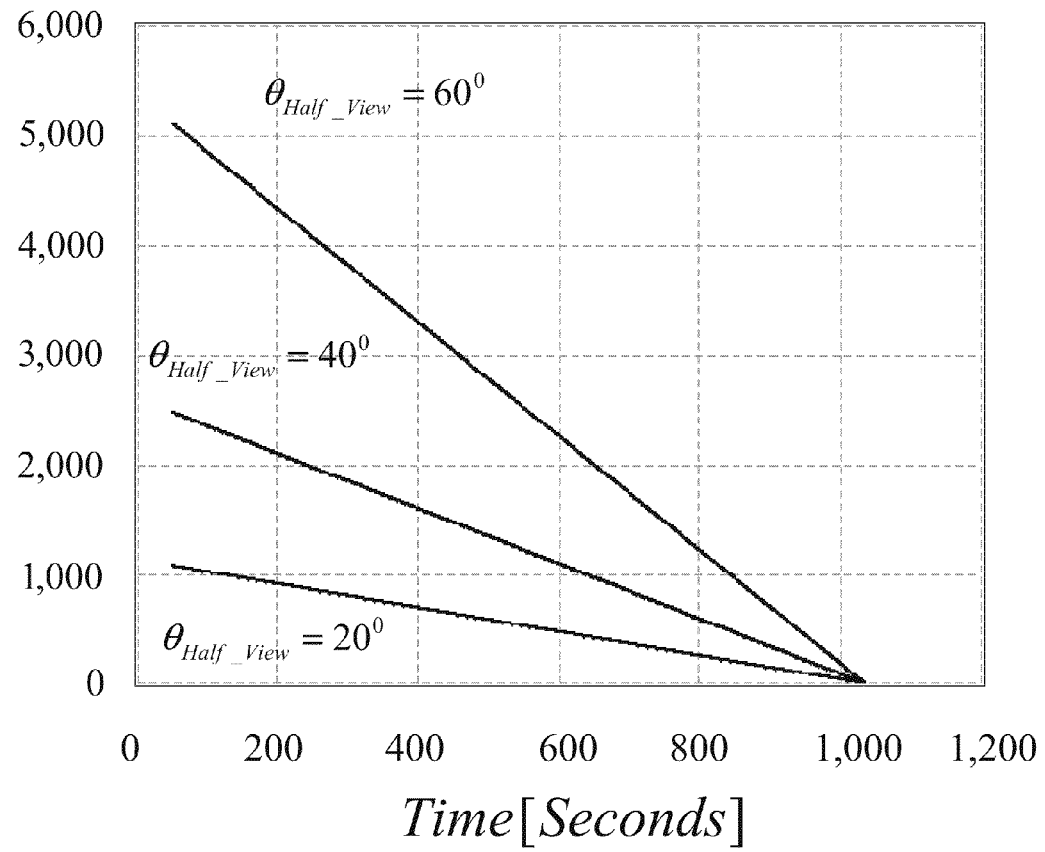
FIG. 20 is a graph illustrating viewing radius of a pod according to the invention launched from an L23 cannon.

FIG. 19 shows the altitude and range as a function of time along with the trajectory of a standard projectile. As can be seen the video capture time is on the order of 1,153 seconds or 19.22 minutes over the target after 50 second of release time after it is delivered to a range of 12,510 meters. This performance cannot be achieved by any other means. Moreover the video reconnaissance is directed to the exact place where it is needed FIG. 20 illustrates the viewing radius from the pod for half-viewing angles 20°, 40° and 60° as a function of time. As can be seen viewing angle decreases as the pod descends towards the earth. The viewing range is calculated by, $$\Delta r_{video}(t)=y(t)tg(\theta_{view}-\delta) \; \Delta r_{video}(t)=y(t)tg(\theta_{view}+\delta) \\ \theta_{view}\approx 20°-60° \; \delta\leq 1° \quad (64)$$

As can be seen in FIG. 20, increasing the view angle is very advantageous, extending the viewing radius from 1,000 to 5,000 meters by increasing the view angle of the optics from 20° to 60° of view angle. Adding the view range to the range will give the maximum video range covered by the pod. The maximum video range from the launch point is a simple sum given as, $$x_{video}(t)=y(t)+y(t)tg(\theta_{view}-\delta) \; x_{video}(t)=y(t)+y(t)tg \\ (\theta_{view}+\delta) \; \theta_{view}\approx 20°-60° \; \delta\leq 1° \quad (65)$$

Figure 21:
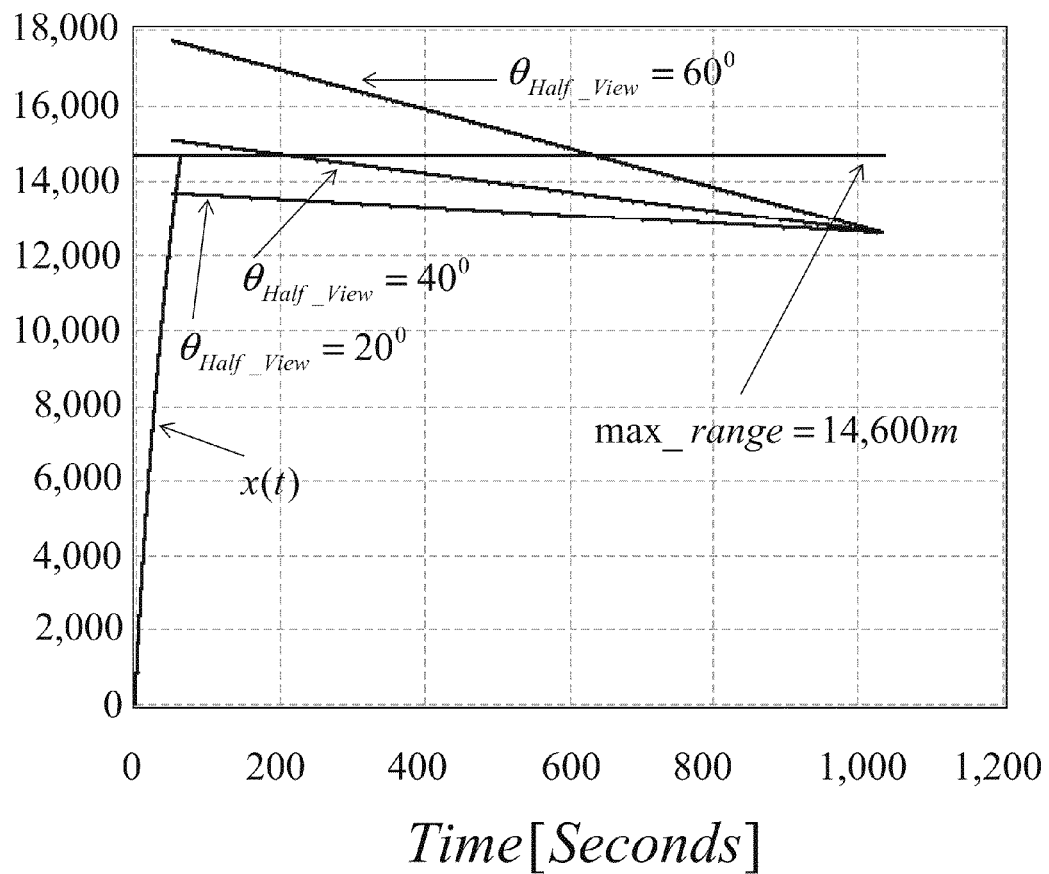
FIG. 21 is a graph illustrating viewing range of a pod according to the invention launched from an L23 cannon.

FIG. 21 shows the maximum range that the video information that can be gathered for half viewing angles of 20°, 40° and 60° as a function of time. As can be seen, increasing the viewing angle of the optics also increases the range even further than the maximum range of the projectile, and it does so for a considerable amount of time.

Figure 22:
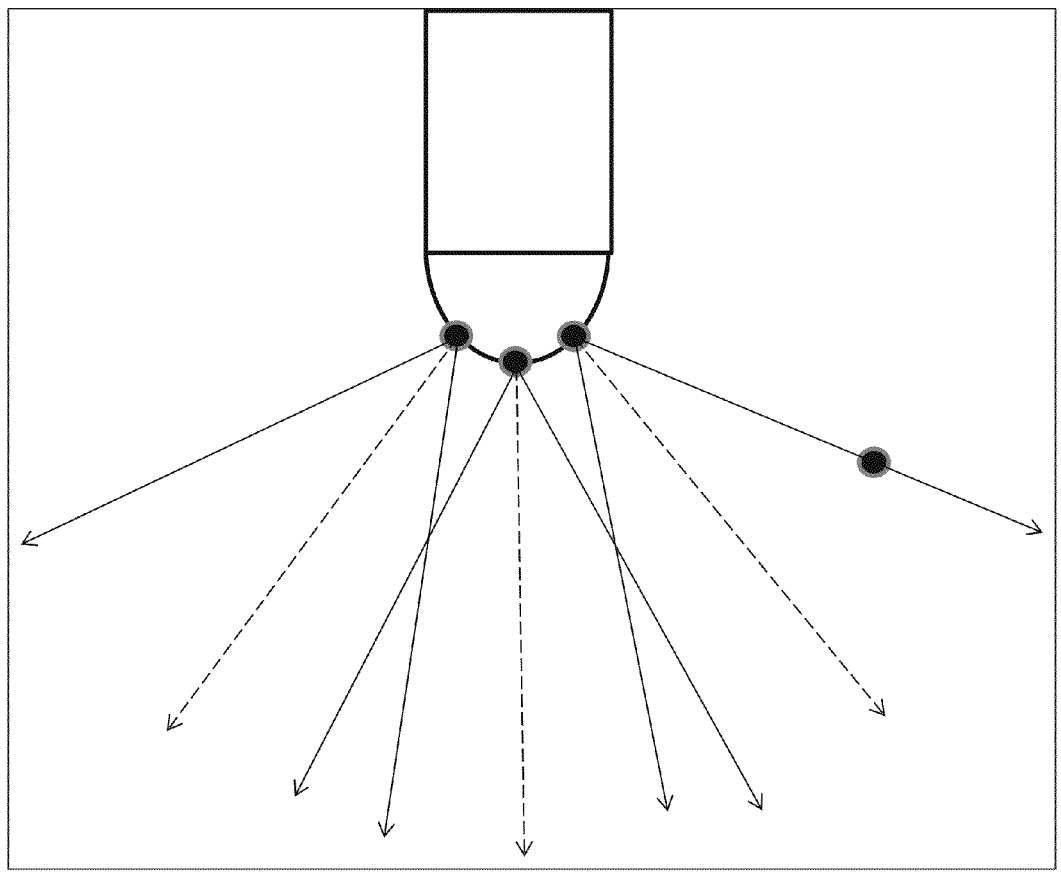
FIG. 22 is a simplified side view of a pod according to the invention showing viewing angles for various locations of a viewing window.

The half viewing angle of 20° is achievable with a single low cost CCD (Charge Coupled Device) camera a such as found in smart phones today. Since there is no space in the pod for advanced optics, the viewing angle of the optics can be increased by having multiple low cost CCD cameras with different but overlapping views as shown in FIG. 22 and FIG. 1. Extending the half viewing angle from 20° to 60° may be achieved by using 9 such CCD cameras of half viewing angle of 20° arranged as shown in FIG. 22. The video information received from 9 CCD cameras is processed in the receiving end in real time such that it gives a fish eye view of the reconnaissance area as a function of time.

Radio Frequency Transmission of the Reconnaissance Video

Video data that is gathered is quite large and depends on the CCD pixel resolution, its size, number of cameras and number of frames per second. The video data rate is calculated as, $$\text{DataRate}=n_{pixel}\times 3\times 8\times n_{frameps}\times n_{cam} \quad (66)$$

where $n_{pixel}$, $n_{frameps}$ and $n_{cam}$ represent number of pixels per frame, number of frames per second and number of cameras respectively.

Since color information in video is represented by three colors Red, Green and Blue (RGB) and they are represented by 8 bits each, the data rate in Equation (66) gives the video data in Bits/Second. If we use standard values such as 3 MBit, 24 and 1 for $n_{pixel}$, $n_{frameps}$ and $n_{cam}$, respectively, Equation (66) will give a 1,728 MBit/sec (Mega Bit/Second) data rate for a single camera pod. A IEEE802.11x standard transmission system, which is employed in almost all wireless LAN's, (Local Area Network) operating at 2.4 GHz, can only achieve a maximum data rate of 600 MBit/sec using the full available bandwidth of 40 MHz bandwidth (instead of its normal 20 MHz bandwidth). This shows that data compression will be needed to transfer the video real time if the 802.11 transmission standard is employed. It should be also noted that this data rate is only for commercially available options. Data transmission rates for military use transmission and satellite TV broadcasting is much higher. The other option is storing the data and continuing the transfer after the pod is on the ground. Therefore the pod should be designed such that it can continue its RF transmission after it makes its soft landing on the ground. Technically the pod will continue its RF transmission until the battery runs out or its self-destruct charge 36 is remotely detonated by the deployer.

The usefulness of the pod does not end after it makes a soft landing to the ground. With its acoustic and seismic sensors it will continue to send information related to the GPS coordinates that it landed. As an example presence of tracked vehicles like tanks and artillery, which generates a large amount of vibration and acoustical noise can be easily detected by the probe in the proximity of the landing site and can be transmitted along with video which can be used to direct artillery fire to the proximity of the landing site which is exactly known. Since there is no control on the final orientation of the pod on the ground, having multiple cameras also enhances the probability of acquiring useful video along with the acoustic and seismic data to be transmitted. As an example for a 9 camera pod on the ground some of the cameras can gather useful video related to the proximity of the landing site while some will just show the ground which has no use. The deployer will also know if the pod is recovered by the change of the relayed GPS coordinate of the pod and can detonate it remotely. However, there must be enough memory for over 20 minutes of data. The memory needed to store the video data is calculated by, $$\text{Data}=n_{pixel}\times 3\times 8\times n_{frameps}\times n_{cam}\times \text{time} \quad (67)$$

where, time is in seconds.

Again using the standard values 3 MBit, 24 and 1 for $n_{pixel}$, $n_{frameps}$ and $n_{cam}$ respectively, (67) will give 2,073,600 MBits (259.2 GByte) of video data for a single camera pod for 20 minutes of video and will take 3,456 seconds or 57.6 minutes to transfer this data at the limits of IEEE802.11 standard. Transferring large amounts of video data is not a unique problem for this invention; the same problem exists in any UAV video transmission using RF transmission and the solution is available. Since the pods also have repeater capabilities operating as a standard "Mesh Network" to form the "Radio Frequency Air Bridge" the total data that needs to be transferred is number of pods multiplied by the result given by Equation (67) in addition to time, GPS and other telemetry data associated with the video information, which is negligible compared to the video information that is transmitted. As a result of this simple arithmetic it is clear that video data compression is necessary to realize real time reconnaissance video information using standard commercially available RF hardware.

On the other hand it is important to note here that RF transmission for military use has some other requirements than those in commercial use, such as higher immunity to jamming, etc. Military specific RF hardware with much higher data transfer rates and security as is available and commonly used today should be employed in this invention to satisfy military RF communication standards.

Example of Establishing the "Radio Communication Air Bridge"

Figure 24:
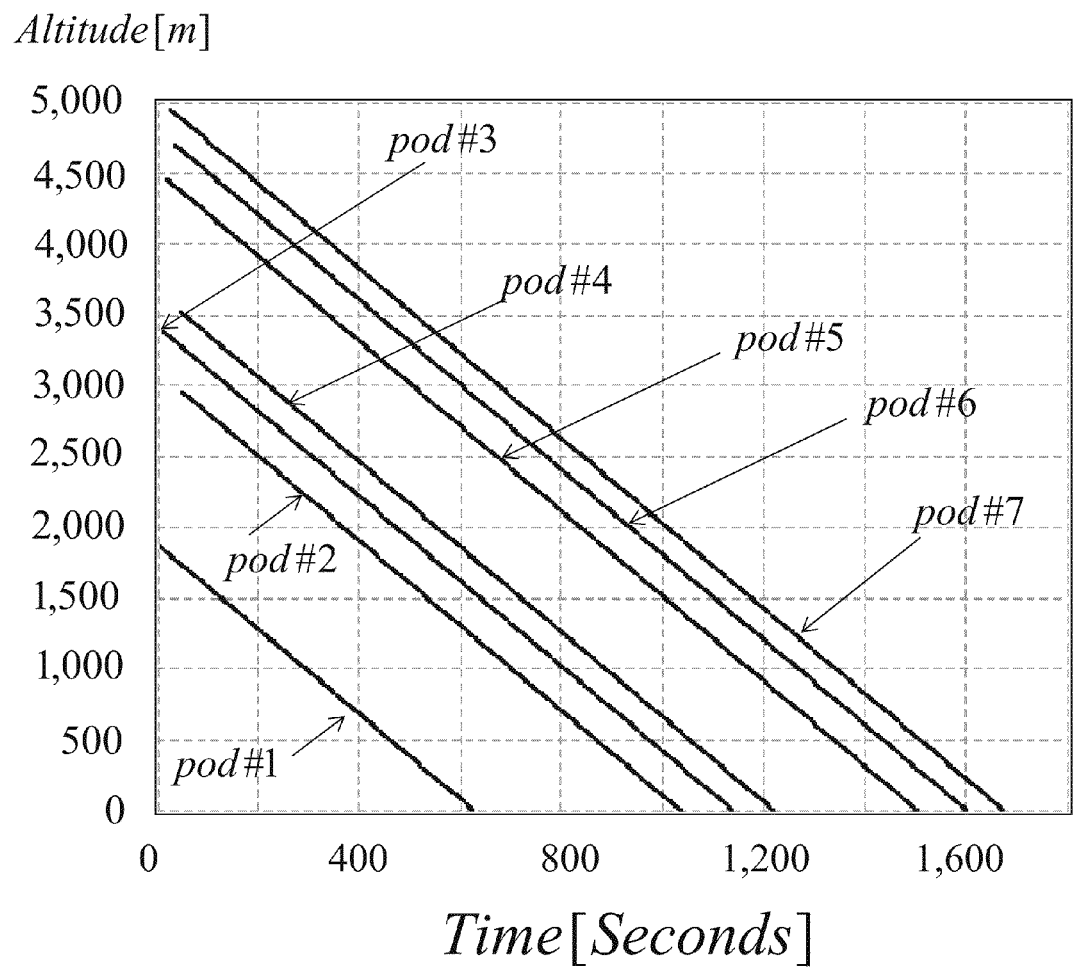
FIG. 24 is a graph illustrating hang time for pods released serially along a projector and used to form a radio frequency air bridge.

FIG. 23 illustrates the principle of using multiple pod launch capability in establishing the "Radio Communication Air Bridge." In this example the pod spacing along the trajectory was set to 2 km which corresponds to the reliable RF transmit range of the pods. In reality it is expected to be even further than 5 km, but this large number of pods illustrates the concept better. A projectile containing 7 pods launched from the 155 mm L23 howitzer with 45° of gun elevation to its maximum range of 14,600 m would produce these contours. The "Ballistic" program may be used to calculate the trajectory and from the given RF range it would also calculate the number of pods that needs to be deployed and calculate the optimal release times of each after the firing of the gun. The values are 5.438 s, 11.74 s, 18.98 s, 27.14 s, 36.30 s, and 46.64 s for the intermediate pods in the "Radio Communication Air Bridge" if the last pod is released 50 seconds after the delivery. FIG. 24 illustrates the height versus time trajectories of pods used for this purpose on the trajectory shown in FIG. 23. As can be seen the release sequence for all pods are realizable by any means.

Usage in Artillery Forward Observer Mode

Using the invention with M203 40 mm grenade launcher is straightforward. Basically the soldier aims the grenade launcher to 45° elevation and fires the pod. It will deploy its parachute at the maximum altitude that it reaches, which is seconds after it is launched. The observers watch the live video as it descends with the parachute. If a different range other than the maximum range is required the "Ballistic" program will calculate the proper elevation angle for the desired range and set the release time of the next parachute accordingly.

The artillery forward observer role can be considered the most demanding use of this invention compared to other possible reconnaissance means. Assume that the GPS coordinates of the gun position and the target are known exactly but there is no visual contact with the gun position due to the distance and/or topography. The objective is to aim the gun such that the projectile will hit the hidden target. It might seem like a simple problem for a geodesic expert, but there are many uncertainties in practice that makes it a difficult problem.

GPS coordinates may be used to accurately calculate the distance and bearing with respect to geographic north. As an example, very accurate calculations are available in all of the mapping functions provided in all of the smart phone application programs provided by OEA International, Inc., of Morgan Hill, Calif. The accuracy of the distance calculation capability between two GPS coordinates anywhere and between any two points for any distance is on the order of meters using the tools of the programs! One such set of programs that can be used to calculate the projectile trajectory is "Ballistic," The powder charge and gun elevation angle can also be calculated. Consider some real life issues that cannot be avoided in practice to show the issues of the problem.

1.0 The barrel elevation and traverse angle can be only controlled with a given finite precision and it will not remain the same all the time for any gun. It is also a function of the age of the gun and how well it is maintained and calibrated.

2.0 There are statistical variations in the ballistic parameters such as muzzle velocity, mass and aerodynamic properties of the projectile. The muzzle velocity with the same powder charge also is dependent on the age of the gun and how well it is maintained.

3.0 Air density is a function of humidity and temperature besides altitude, and it is a very important parameter in the trajectory calculation, as shown earlier with the altitude effect. Even if the ballistic simulator can handle wind direction and speed, the information is not available on enough points on the trajectory for accurate simulation. It is fair to say these parameters are only available at the gun position.

4.0 Bearing information is generally calculated correctly from the GPS coordinates, but it is given with respect to geographic north [12]. In practice mainly magnetic compass readings are used with the latest declination information, which can be at least six months old for that particular gun position! There are other issues with a magnetic compass and earth's magnetic field. There are sites that give magnetic declination for any GPS coordinates on earth but one has to remember these are basically interpolation data using Gaussian Spherical Harmonic functions obtained from magnetic measurements done at hundreds of magnetic observatories and from satellites like Magsat and Oersted, so their accuracy really depends on the GPS location of the gun position respect to the data points [16]. An alternative is to use a GPS compass that can give accuracy of 0.1° in bearing information anywhere any time, but it is not generally available for every gun position!

Assume the earth is flat and then define distance error as the distance between the target coordinate and the coordinate of actual projectile where it hits the earth surface, it can be calculated by the chord length formula for a circle. For this assumption the distance error for a bearing error of δ at a target range of r will be given as, $$\text{error} = 2r\sin\left(\frac{\delta}{2}\right) \tag{68}$$

For bearing errors of 0.1° and 1° for a range of 40 km, Equation (68) will give distance errors of 69.81 and 698.12 meters respectively, and it is directly proportional with the range as can be seen in Equation (68).

5.0 The temperature of the gun barrel is also important. The gun barrel will deflect downwards with increasing barrel temperature changing the effective barrel elevation angle. The friction between projectile and the gun barrel is also a function of the barrel temperature. Therefore the muzzle velocity of the first round from a cold barrel is different than later rounds.

Because all of these uncertainties, scoring a hit based on pure ballistics and aiming on a long range target is always a difficult problem. As an example the record hit in a naval history is from a range of 24,100 m achieved in 4, Jun. 1940 with the 280 mm (11 inch) guns of the German battle ship Scharnhorst against the Royal Navy aircraft carrier HMS Glorious off the coast of Norway. Even naval engagements are done in visible range, since the maximum firing ranges of the guns involved in that exchange was far greater than 24,100 m and this is the historical record naval shot.

The standard practice in the field for centuries has been to fire a "ranging shot" with the best available data in hand and observe where the shot hits with respect to the target. Corrections are made for the elevation and the traverse angle of the gun based on the error and firing is repeated and repeating until a hit is scored. This iterative process requires several rounds to be fired and observed. Once the shots are close enough, fire control will issue "good rapid" order, which is a call for a salvo with all the guns under his command with the data obtained with this process of iteration. In the case of artillery exchange, whoever can go through this process faster basically wins.

In the epic Battle of the Denmark Strait on 23 May 1940, German Battleship Bismarck sunk the Royal Navy battle cruiser Hood from a range of 14,000 m with its 15-inch guns on the fifth salvo while getting 3 hits from the 14 inch guns of battleship HMS Prince of Wales. The artillery exchange started with Hood and Prince of Wales beginning their salvos at 5:52 and receiving the first reply from Bismarck and Prince Eugen at 5:55. Bismarck fire control and gunnery were ready and could have replied earlier, but there was a hesitation to open fire within the bridge of Bismarck which caused this delay. Even the "open fire" command came late due to Admiral Lutjens hesitation, at the fifth salvo in 5 minutes of artillery exchange, Bismarck scored a direct hit on Hood at 6:00 and Hood exploded. Thus it was only eight minutes of artillery exchange between HMS Hood, HMS Prince of Wales (with a total of 8×15 inch and 10×14 inch guns, but not all were used due to the bearing and course, along with mechanical issues in HMS Prince of Wales) and Bismarck and Prince Eugen (with a total of 8×15 inch and 8×8 inch guns).

These real life and historical examples above show the practical hit range in an artillery exchange, as well as the importance of the execution time of the ranging iterations. The second example also shows the importance of this invention in reducing the time of the ranging iterations.

In land battles, observation is done by Forward Observers (FO), who are already in positions where they can see and estimate distances between the shots fired and the target. As one can imagine, this is a very high risk mission, because the often unprotected FO's must be tens of km in enemy-controlled territory and be undetected. The information from the FO's to the fire control must be done in such a way that their location is not detected by the enemy. Traditionally this is done by a field telephone with a back-up radio. Thus there is a requirement for additional manpower for establishing communication between the FO's and the fire control.

This invention can completely eliminate the need for FO's and their communication resources. In addition, since the GPS coordinates of the pod and the target are known, the error can be calculated precisely using the mapping software on the video image rather than using the best guess of the FO's.

Calculation of distances and bearing between two given GPS coordinates is the main routine behind the software program in the receiving end of fire control. This capability is already provided in application programs available from OEA International, Inc., with accuracy measured in meters between any two coordinates anywhere on earth using analytical relations.

Using spherical trigonometry one can in theory calculate distances between 2 points on a perfect sphere. When the distances between points are very small compared to the radius of the earth, such as a typical artillery range finding case, or the points become separated with distances on the order of the circumference of the earth, there will be issues related the precision in calculation of the trigonometric functions. These very close and very far points are known as antipodal points, and calculations become very difficult. Historically the issues with antipodal points were handled by defining the Cos(x) function by the Haversine formula in distance calculations, which gives much better results for points which are close to each other. Using, $$\text{haversin}(\theta) = \text{Sin}^2\left(\frac{\theta}{2}\right) = \frac{1 - \text{Cos}(\theta)}{2} \quad (69)$$

eliminates many issues with Cos(x) in the distance calculations, but still some issues related to the precision and earth's geometry not being a perfect sphere remain. The great circle distance between two points using the Haversine formula, which has a very important historical place in navigation and is given by, $$d = 2r\text{Sin}^{-1}\left[\sqrt{\text{Sin}^2\left(\frac{\theta_{L2} - \theta_{L2}}{2}\right) + \text{Cos}(\theta_{L1})\text{Cos}(\theta_{L2})\text{Sin}^2\left(\frac{\phi_2 - \phi_1}{2}\right)}\right] \quad (70)$$

where $\theta_{L1}$, $\theta_{L2}$, $\phi_1$, $\phi_2$ and r are latitude and longitude of points 1 and 2 and radius of the earth respectively.

In 1950, the very elegant analytical formulation given by H. Andoyer allowed point to point distance calculations on the real geometry of the earth and it also eliminated the antipodal issues. OEA International, Inc. routines use this formulation as default and also provides sub-meter accuracy capability by employing Vincente's iterative formulations and even better than cm accuracy is provided as an option using quadruple precision with additional analytical techniques. Therefore the "best guess" distance and bearing information provided by the FO's today cannot match the accuracy and speed provided by using these geodesic capabilities in the OEA application programs.

M203 Launched 40 mm Grenade Launch Simulation Results

In the pod launch using 40 mm M203 grenade launcher case, where the pod itself is the delivery projectile, the parachute will be deployed at a programmed time, and it will start descending toward the surface of the earth. Video capture will then start along with its data transmission to the launch location. In other words there is no "free-fall" stage as in the earlier case. In addition to that the projectile speed is low.

Figure 25:
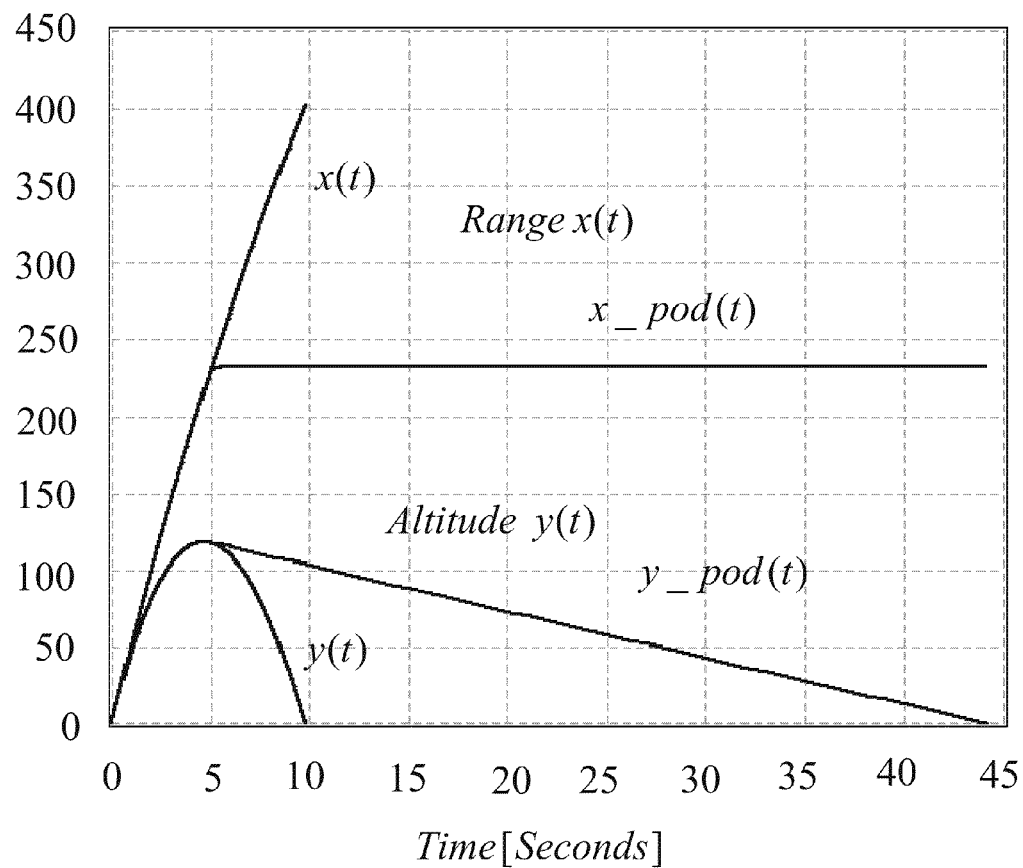
FIG. 25 is a graph that shows the trajectory of the pod after it is launched from M203 grenade launcher with 45° of barrel elevation angle.

FIG. 25 shows the trajectory of the pod after it is launched from M203 grenade launcher with 45° of barrel elevation angle. As can be seen the pod descends to the surface of the earth almost perpendicularly during its parachute assisted descent as in the earlier case. As can be seen the video capture time is 40 seconds for the ejection time of 5 seconds after launch.

Figure 26:
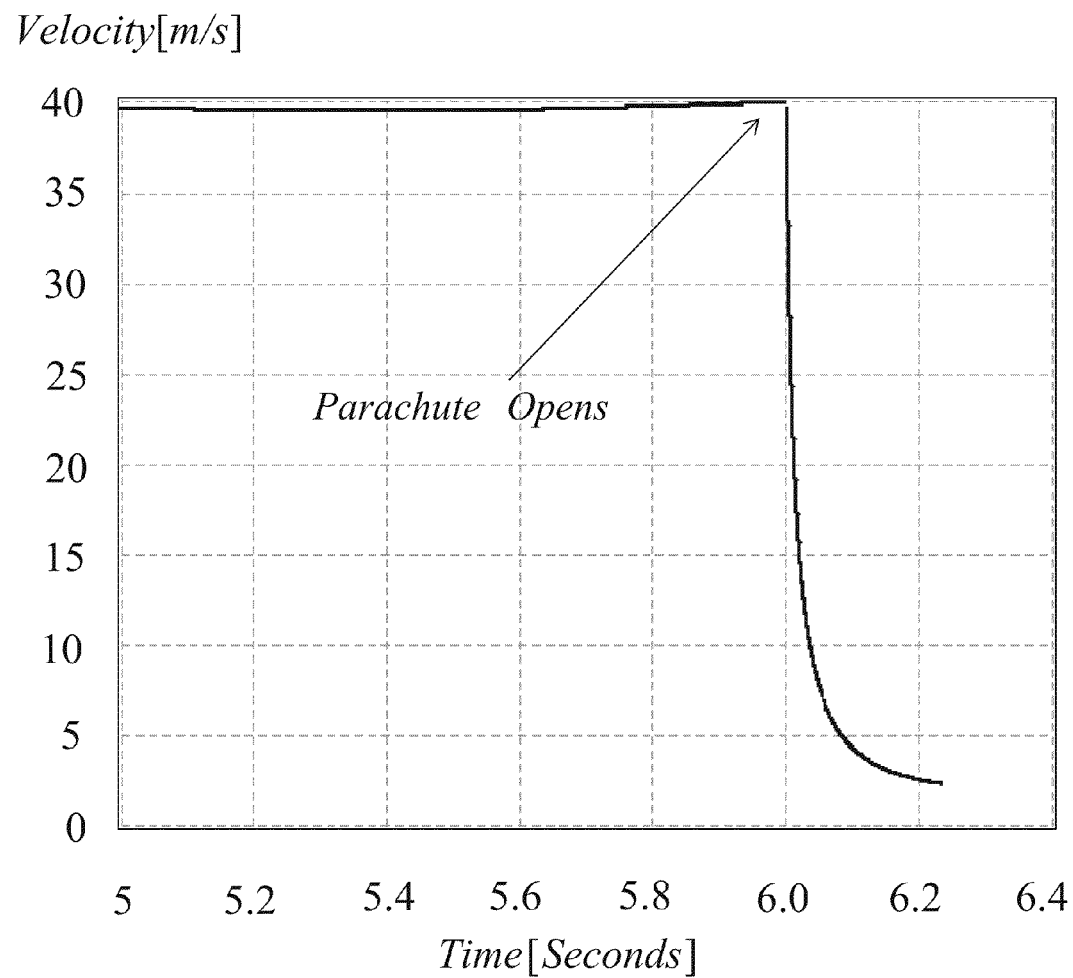
FIG. 26 is a graph that shows the velocity of a pod after its release time of 5 seconds.
Figure 27:
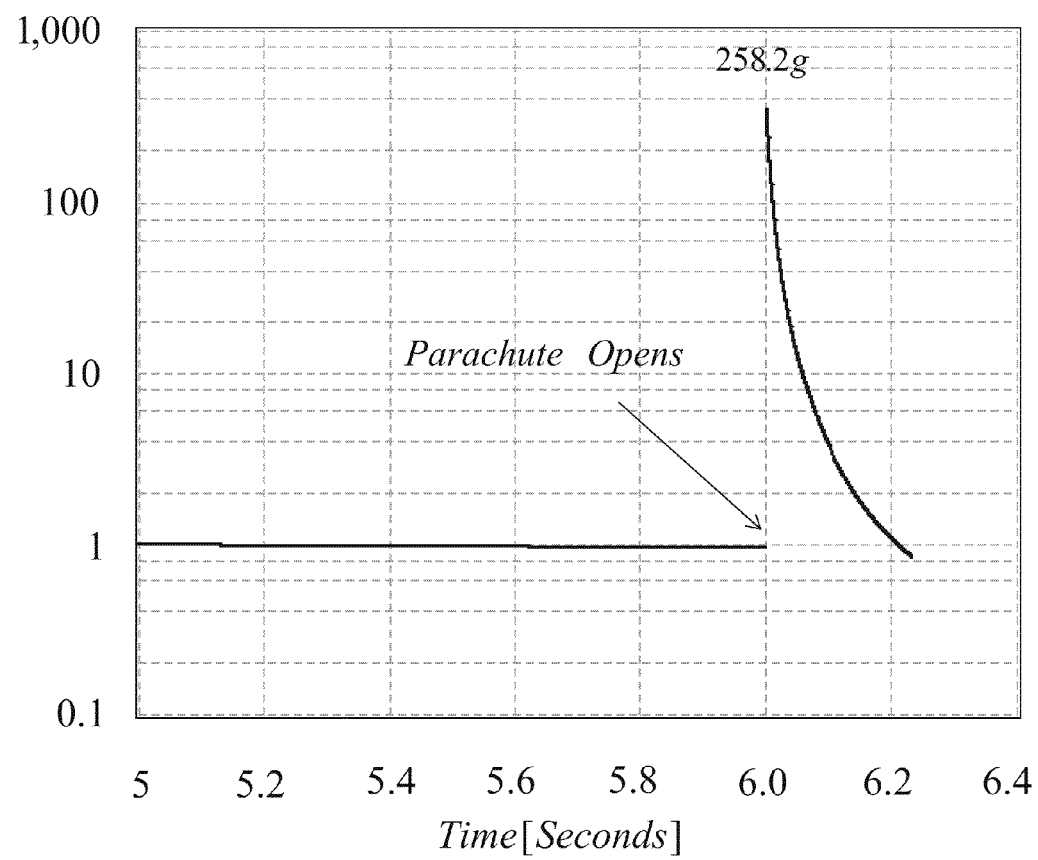
FIG. 27 is a graph that shows the deceleration of a pod as a function of time.

FIG. 26 shows the velocity of the pod after its release time of 5 seconds. As can be seen its velocity is in the order of 40 m/s when the parachute is deployed and there is no need to worry about the very high g issues as in the earlier example. In approximately 0.2 seconds it will reach its limit velocity of 2.1336 m/s (7 feet/second). FIG. 27 shows the deceleration of the pod as a function of time. It is assumed that the parachute deploys immediately and it reaches its final shape.

Figure 28:
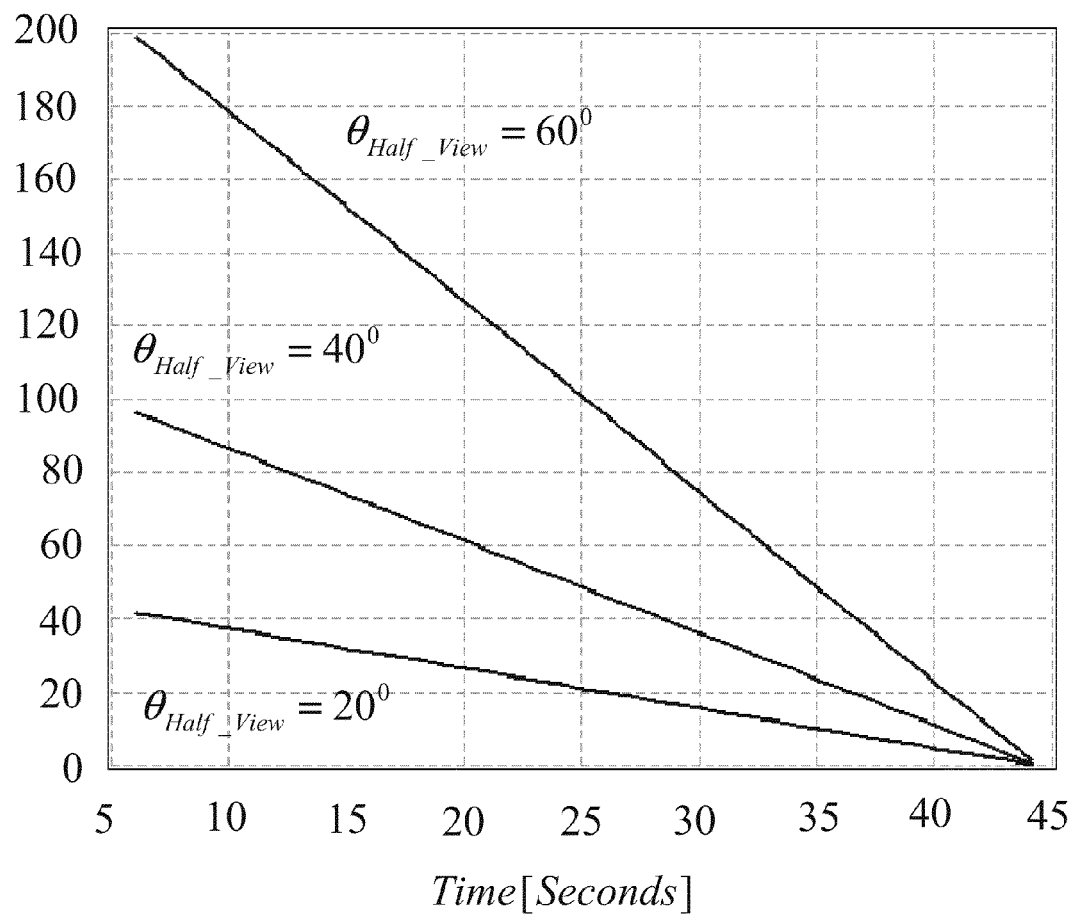
FIG. 28 is a graph that shows the viewing radius from a pod for 20°, 40° and 60° of half-viewing angle of the camera system as a function of time.

FIG. 28 shows the viewing radius from the pod for 20°, 40° and 60° of half-viewing angle of the camera system as a function of time. As can be seen it decreases as the pod descends towards the earth. As can be seen the advantage of increasing the view angle is shown in FIG. 20, extending the viewing radius from 40 to 200 meters by increasing the view angle of the optics from 20° to 60° of view angle.

Figure 29:
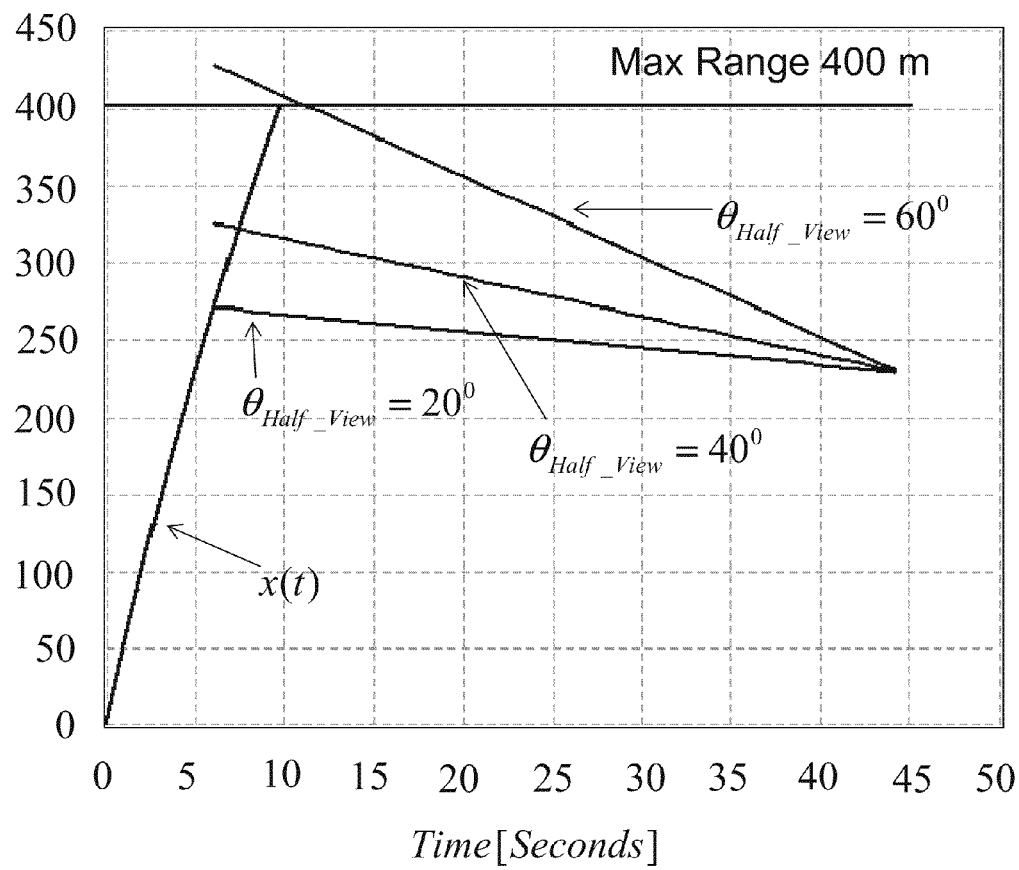
FIG. 29 is a graph that shows the maximum range that video information can be gathered for 20°, 40° and 60° of viewing angle as a function of time.

FIG. 29 shows the maximum range that video information can be gathered for 20°, 40° and 60° of viewing angle as a function of time. Using half view angle of 600 gives the pod the capability of video capture range of 400 m which is the maximum range of a 40 mm grenade launched from a M203.

Usage of the Invention

As can be seen the calculations associated with the invention that make targeting effective are based on the accurate simulation capability associated with a projectile launched from by any means of artillery or rocket system. In operation according to the invention, an operator enters the GPS coordinates of the region of interest and the points along the trajectory at which the pod 10 or pods 100 are to be deployed via parachute. Based on time of from the gun barrel or deployment from above, the delivery system and the "Ballistic" program calculate the launch solutions, identify the best launch solution, gun angle elevation, compass direction and timing of desired release points, as well as the traverse angle at the point of launch, along with the available or needed amount of propellant, if applicable, for the gun used. In particular, these release times of the pods will be calculated and will be programmed automatically by the computer using for example the "Ballistic" program. The computer may also initialize the pods, its GPS coordinates and visible satellite information and perform system checks on the pods in the projectile before it is launched. The starting GPS coordinates are necessary because the pods will not have GPS reception while in the barrel or in a delivery projectile. Satellite acquisition will take on the order of minute after the GPS signal becomes available, which is after the parachute is deployed.

The ground computer can be a smart phone, computer tablet or any other artillery fire control computer. As far as the user is concerned, the "Ballistic" program is basically a smart phone or tablet application program.

The invention has been explained with reference to specific embodiments. Other embodiments will be evident to those of ordinary skill in the art based on this explanation. It is therefore not intended that this invention be limited, except as indicated by the appended claims.

What is claimed is:

1. A field artillery reconnaissance system comprising:
   an fire control system deployed adjacent a capsule launching platform for automatically selecting trajectories and targets in response to input from a reconnaissance pod;
   a modular reconnaissance pod enclosed in a capsule, the capsule having a form factor and weight distribution configured for deployment by means of said capsule launching platform, the pod containing:
   an observation subsystem for obtaining images of a target directly below the pod when the pod is within a target area;
   a GPS locator subsystem and compass subsystem to obtain information on location and orientation with respect to true north of the pod and the target area;
   a wireless communication subsystem for communicating said images, said location information and said orientation information to said fire control system;
   a parachute subsystem for moderating descent of the pod over the target area;
   an air brake associated with the pod to controllably slow deceleration of the pod; and
   a control subsystem coupled to the observation subsystem, the locator subsystem and compass subsystem, the air brake, the parachute subsystem, and the communication subsystem for controlling deployment of the pod and observation along a predetermined trajectory for a period while the pod is over the target area, further including a ring disposed within walls of the capsule and wherein mass and mass distribution within the capsule is impacted by location and weight of the ring within the capsule.

2. A method for conducting field artillery action comprising:
   employing a fire control system to select first three-dimensional spatial coordinates of a target in a ground target area;
   employing said fire control system to automatically select second three-dimensional spatial coordinates at a specified elevation directly over said ground target area based on said first three-dimensional spatial coordinates;
   launching via a capsule launching platform a reconnaissance capsule containing a pod, said pod having an observation subsystem, a locator subsystem including a compass for determining orientation to True North, and a Global Positioning System (GPS) unit for determining position in altitude and coordinate location, a communication subsystem, a parachute subsystem, and a control subsystem coupled to the observation subsystem, the locator subsystem, the parachute subsystem, and the communication subsystem, and, upon sensing via said locator subsystem achievement of said second spatial coordinates near the ground target area along a first trajectory past said ground target area:
   causing said control subsystem to deploy said air brake and then said parachute subsystem to temporarily suspend the capsule directly over the ground target area; then
   launching first ordnance at said ground target along a second trajectory toward said first three-dimensional spatial coordinates of said target in said ground target area;
   causing said control subsystem to enable said observation subsystem near said second three-dimensional coordinates to capture images of said target area directly below said pod and the locator subsystem to collect first location data referenced to said pod and orientation data with respect to True North about said target and second location data about said first ordnance at impact in form of at least one image during a descent of the pod while slowed by the parachute;
   causing said control system to enable said communication subsystem to communicate said images with said orientation data, said first location data and said second location data to the fire control system;
   determining automatically using said fire control system, based on said first location data and said second location data, a location error between said first location data and said second location data;
   correcting firing coordinates according to said location error; and
   launching second ordnance at said target with targeting coordinates corrected for said location error, wherein said capsule, said first ordnance and said second ordnance have the same form factor, weight and weight distribution.

3. The method of claim 2 wherein the ordnance is a 155 mm cannon shell.

4. The method of claim 2 wherein the projectile contains a plurality of said capsules that are configured to be deployed along the first trajectory, wherein in at least one of said capsules is configured to store and forward communication intelligence from another one of said capsules toward the receiving station, in order to extend the effective range of reconnaissance.

5. The method according to claim 2 further including the step of causing the projectile to deploy an air brake operatively coupled to the control subsystem, and operative to activate prior to deployment of the parachute.

6. The method of claim 2 further including positioning of a weight within said capsule to adjust weight distribution of said capsule to match weight distribution of said ordnance.

7. The method of claim 2 wherein the reconnaissance capsule is an artillery shell, said artillery shell further containing a plurality of radio relay station pods having parachutes as part of a cluster, further comprising the steps of:
   releasing said radio relay station pods from said shell along said first trajectory; and
   relaying said images to said fire control system via said radio relay stations during their descent.

* * * * *